US009767395B2

(12) United States Patent
Mori

(10) Patent No.: US 9,767,395 B2
(45) Date of Patent: Sep. 19, 2017

(54) IMAGE FORMING APPARATUS WITH COPY HISTORY AND CONTROL METHOD FOR THE SAME

(71) Applicant: CANON KABUSHIKI KAISHA, Tokyo (JP)

(72) Inventor: Atsunobu Mori, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/886,229

(22) Filed: Oct. 19, 2015

(65) Prior Publication Data
US 2016/0124362 A1 May 5, 2016

(30) Foreign Application Priority Data
Oct. 29, 2014 (JP) .................. 2014-220626

(51) Int. Cl.
*G03G 15/00* (2006.01)
*G06K 15/12* (2006.01)
*H04N 1/00* (2006.01)

(52) U.S. Cl.
CPC ......... *G06K 15/12* (2013.01); *G03G 15/5025* (2013.01); *H04N 1/00* (2013.01); *H04N 1/00846* (2013.01); *H04N 1/00867* (2013.01); *H04N 1/00875* (2013.01); *H04N 1/00877* (2013.01)

(58) Field of Classification Search
CPC ........... G03G 15/04018; G03G 15/507; G03G 21/04; G03G 21/043; G03G 21/046; G03G 2215/00928; G03G 15/50; G03G 15/5025; G06F 3/1222; G06F 3/1238; G06F 3/1242; G06F 3/1273; H04N 1/00; H04N 1/00846; H04N 1/00867; H04N 1/00875; H04N 1/00877
USPC .......................................... 399/38
See application file for complete search history.

(56) References Cited

U.S. PATENT DOCUMENTS

| 8,081,348 | B2 | 12/2011 | Hosoda | |
|---|---|---|---|---|
| 2009/0021765 | A1* | 1/2009 | Takahashi | ........ G03G 15/04018 358/1.14 |
| 2009/0066987 | A1* | 3/2009 | Inokuchi | ................ G03G 15/36 358/1.13 |

(Continued)

FOREIGN PATENT DOCUMENTS

| JP | 2006-229670 | | 8/2006 |
|---|---|---|---|
| JP | 2006229670 A | * | 8/2006 |

(Continued)

*Primary Examiner* — Francis Gray
(74) *Attorney, Agent, or Firm* — Fitzpatrick, Cella, Harper & Scinto

(57) ABSTRACT

An image forming apparatus comprises: an image forming unit configured to form an image; an image scanning unit configured to scan an image; and a control unit configured to perform control of the image forming unit and the image scanning unit, wherein the control unit controls the image scanning unit to scan an original, controls the image forming unit to form an additional image on the original after the scanning of the original is completed, and controls the image forming unit to form, after the formation of the additional image on the original is completed, an image in which the original is copied based on image information of the original scanned by the image scanning unit.

13 Claims, 16 Drawing Sheets

(56) References Cited

U.S. PATENT DOCUMENTS

| | | | | |
|---|---|---|---|---|
| 2009/0116075 | A1* | 5/2009 | Arai | G03G 21/043 |
| | | | | 358/3.28 |
| 2009/0279109 | A1* | 11/2009 | Shiozawa | G03G 15/50 |
| | | | | 358/1.2 |
| 2010/0157392 | A1* | 6/2010 | Tsuzuki | G03G 21/046 |
| | | | | 358/498 |
| 2011/0205601 | A1* | 8/2011 | Akimoto | G03G 21/046 |
| | | | | 358/475 |
| 2013/0256968 | A1* | 10/2013 | Furukawa | H04N 1/00 |
| | | | | 270/14 |
| 2013/0294795 | A1 | 11/2013 | Tamura et al. | |
| 2014/0043659 | A1* | 2/2014 | Kawakami | G06K 9/344 |
| | | | | 358/470 |
| 2015/0169391 | A1* | 6/2015 | Asai | G06F 9/543 |
| | | | | 719/313 |

FOREIGN PATENT DOCUMENTS

| | | |
|---|---|---|
| JP | 2009-177726 | 8/2009 |
| JP | 2013-235039 | 11/2013 |
| JP | 2013235039 A * | 11/2013 |

* cited by examiner

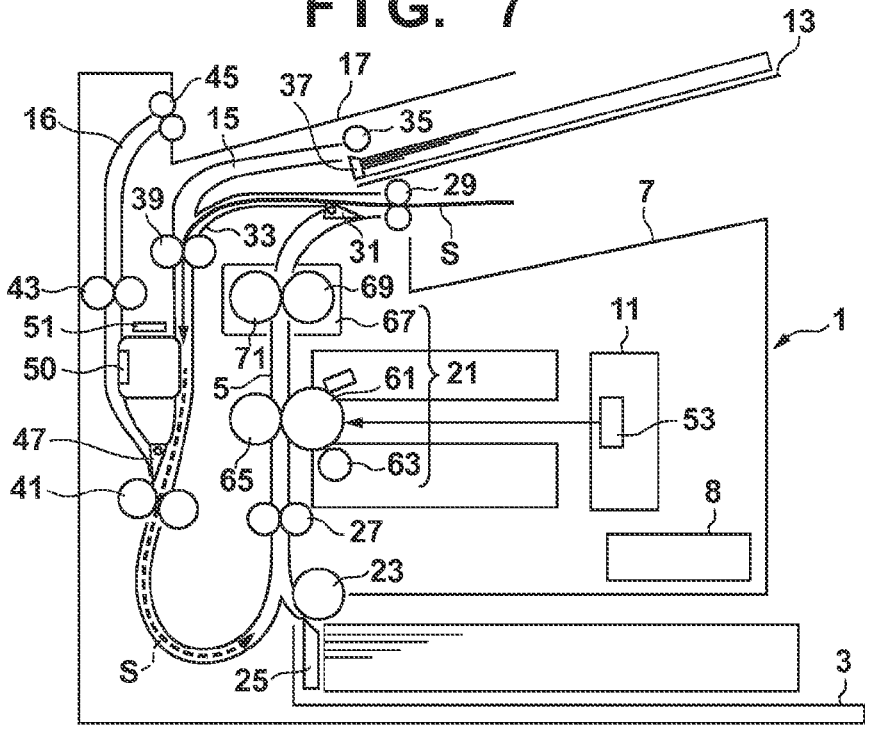
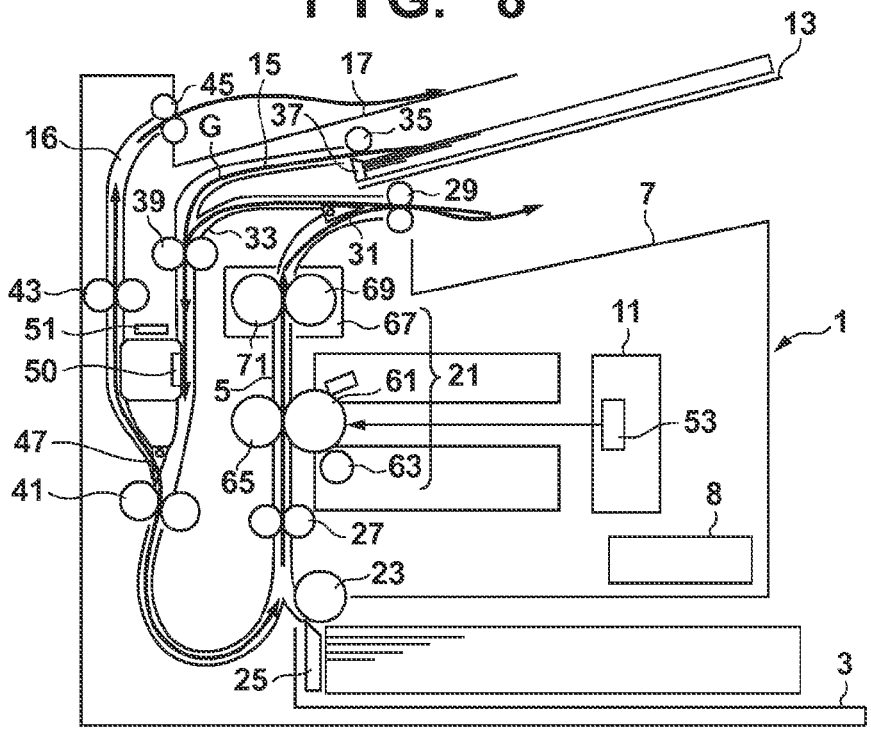

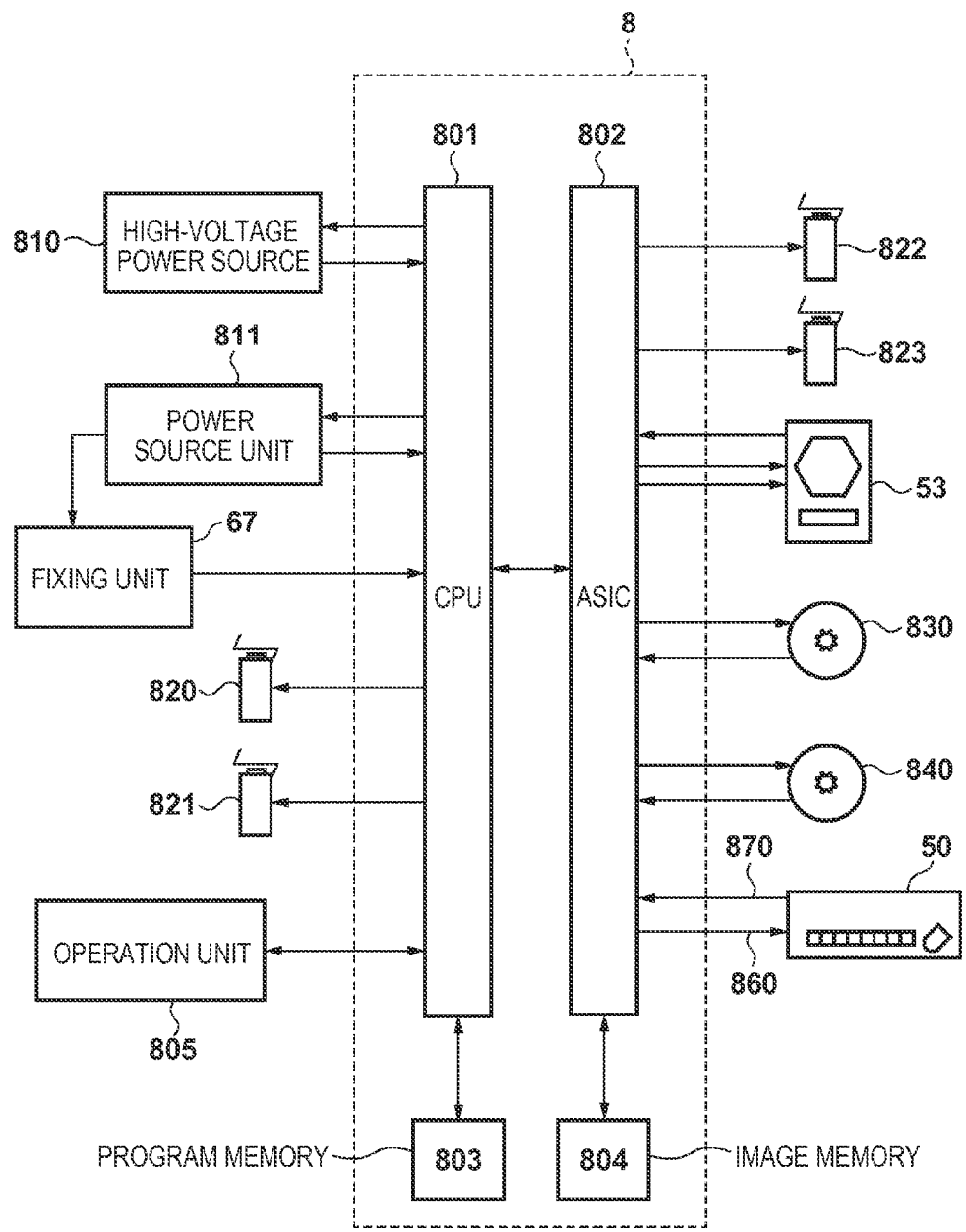

```
COPY HISTORY INFORMATION SETTING SCREEN
INPUT COPY HISTORY INFORMATION
    DEPARTMENT: [CHARACTER STRING INPUT]
    NAME: [CHARACTER STRING INPUT]

SELECT INFORMATION TO BE ADDED TO COPY
  ● COPY PROHIBITED        ○ REDISTRIBUTION PROHIBITED
  ○ SUBJECT TO SHREDDING
    [ OK ]                          [ CANCEL ]
```
~901

IMAGE FORMING APPARATUS WITH COPY HISTORY AND CONTROL METHOD FOR THE SAME

BACKGROUND OF THE INVENTION

Field of the Invention

The present invention relates to an image forming apparatus and a control method for the same.

Description of the Related Art

Conventionally, Japanese Patent Laid-Open No. 2006-229670 discloses a technique in which when copying is performed, an original output unit adds copy history information to an original so that it is possible to track a leakage route in the event of information leakage. Furthermore, Japanese Patent Laid-Open No. 2013-235039 discloses an image forming apparatus that includes a scanning unit, and is configured to be capable of adding an image to an original and generating a copy based on image information of the original.

Here, there is the problem that when, for example, copy history information is used as the image that is added to an original, it is difficult to ensure information security, depending on the execution timings of adding the copy history information to the original and generating the copy based on image information of the original.

SUMMARY OF THE INVENTION

In view of the above-described problem, the present invention controls the execution timings of adding copy history information to an original and generating a copy based on image information of the original, thereby improving information security.

According to one aspect of the present invention, there is provided an image forming apparatus comprising: an image forming unit configured to form an image; an image scanning unit configured to scan an image; and a control unit configured to perform control of the image forming unit and the image scanning unit, wherein the control unit controls the image scanning unit to scan an original, controls the image forming unit to form an additional image on the original after the scanning of the original is completed, and controls the image forming unit to form, after the formation of the additional image on the original is completed, an image in which the original is copied based on image information of the original scanned by the image scanning unit.

According to another aspect of the present invention, there is provided a control method of an image forming apparatus including an image forming unit configured to form an image, and an image scanning unit configured to scan an image, the method comprising the steps of: a control unit controlling the image scanning unit to scan an original; a control unit controlling the image forming unit to form an additional image on the original after the scanning of the original is completed, and a control unit controlling the image forming unit to form, after the forming of the additional image on the original is completed, an image in which the original is copied based on image information of the original scanned by the image scanning unit.

According to the present invention, it is possible to control the execution timings of adding copy history information to an original and generating a copy based on image information of the original, thereby improving information security.

Further features of the present invention will become apparent from the following description of exemplary embodiments (with reference to the attached drawings).

BRIEF DESCRIPTION OF THE DRAWINGS

FIG. 7 is a diagram illustrating image formation according to the first embodiment.

FIG. 8 is a diagram illustrating an operation of printing processing (information adding and printing processing) that is subjected to an original according to the first embodiment.

FIG. 9 is a diagram illustrating an example of an internal configuration of electric components of the image forming apparatus according to the first embodiment.

DESCRIPTION OF THE EMBODIMENTS

Hereinafter, embodiments for implementing the present invention will be described with reference to the drawings. An apparatus according to the invention of the present application corresponds to an image scanning apparatus represented by an auto document feeder unit (ADF), an image forming apparatus including the ADF that has multiple functions represented by a photocopier, a laser beam printer (LBP), and a facsimile, and the like. In the following embodiments, descriptions will be given taking an image forming apparatus as an example.

First Embodiment

Figure 1:
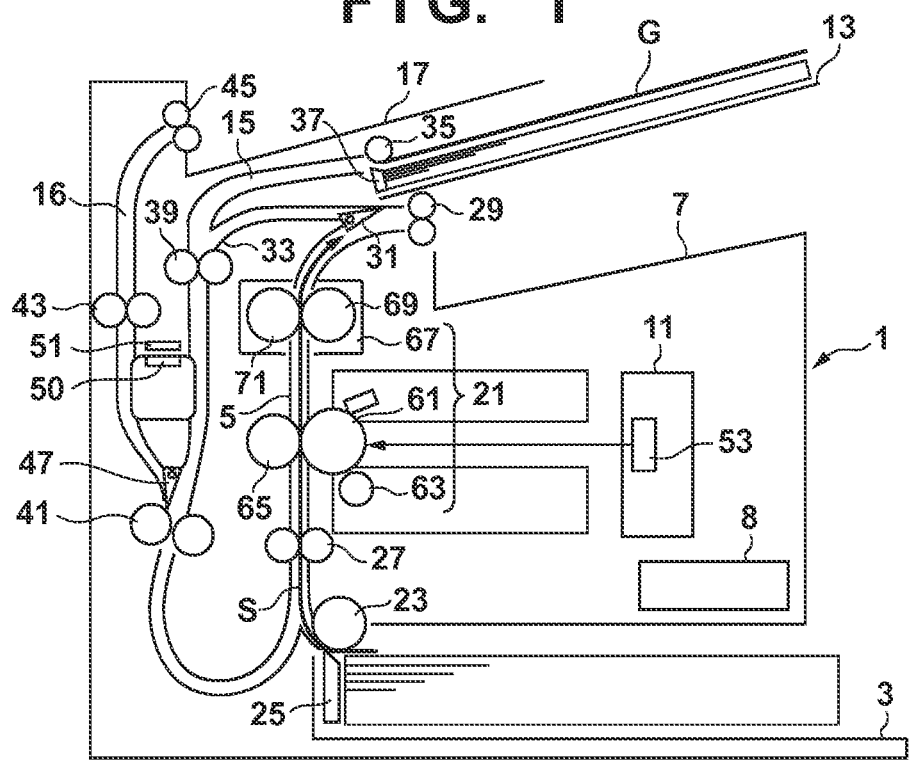
FIG. 1 is a diagram illustrating an example of a configuration of an image forming apparatus according to a first embodiment.

FIG. 1 is a diagram schematically illustrating a cross-section of an image forming apparatus 1 according to the present embodiment. The image forming apparatus 1 is provided with a first sheet feed unit 3 in which recording material sheets S are accommodated, a first conveyance path 5 for conveying a recording material sheet S from the first sheet feed unit 3, a first sheet discharge unit 7 on which the conveyed recording material sheet S is loaded, an electric component 8, and an optical unit 11. Hereinafter, the first conveyance path 5 is referred to also as "recording material sheet conveyance path". Examples of the recording material sheets S include printed sheets, transfer paper, OHP sheets, and the like, but the present invention is not limited to these. The image forming apparatus 1 is further provided with a second sheet feed unit 13 in which an original G on which image information is described is accommodated, a second conveyance path 15 for conveying the original G from the second sheet feed unit 13, a third conveyance path 16 for conveying the original G to a second sheet discharge unit 17, and the second sheet discharge unit 17 on which the conveyed original G is loaded. The second conveyance path 15 and the third conveyance path 16 are hereinafter referred to also as "original conveyance paths". The details of the image information will be described later.

The recording material sheet conveyance path 5 is provided with a printing unit 21 that prints an image on the recording material sheet S, a cassette tray (CST) pickup roller 23 that conveys the recording material sheet S, separating unit 25, conveyance rollers 27, sheet discharge rollers 29, and a double-sided flapper 31 for double-sided printing. The original conveyance path 15 is provided with a reverse conveyance path 33 that conveys the original G or the recording material sheet S with its side reversed, a contact image sensor (CIS) pickup roller 35 that conveys the original G, separating unit 37, and conveyance rollers 39 and 41. The original conveyance path 16 is provided with conveyance rollers 43, sheet discharge rollers 45, and a switchback flapper 47. The original conveyance path 16 is connected to the reverse conveyance path 33 at the position of the switchback flapper 47. By controlling the various flappers and the various rollers to switch between merging and separating of the recording material sheet S and the original G that are conveyed on the original conveyance path and the recording material sheet conveyance path, it is possible to convey the recording material sheet S and the original G. In other words, the recording material sheet conveyance path 5, and the original conveyance paths 15 and 16 are each configured to be subjected to conveyance control so as to be capable of conveying the recording material sheet S and the original G to another conveyance path. A specific configuration of conveyance will be described later with reference to the drawings.

Figure 3:
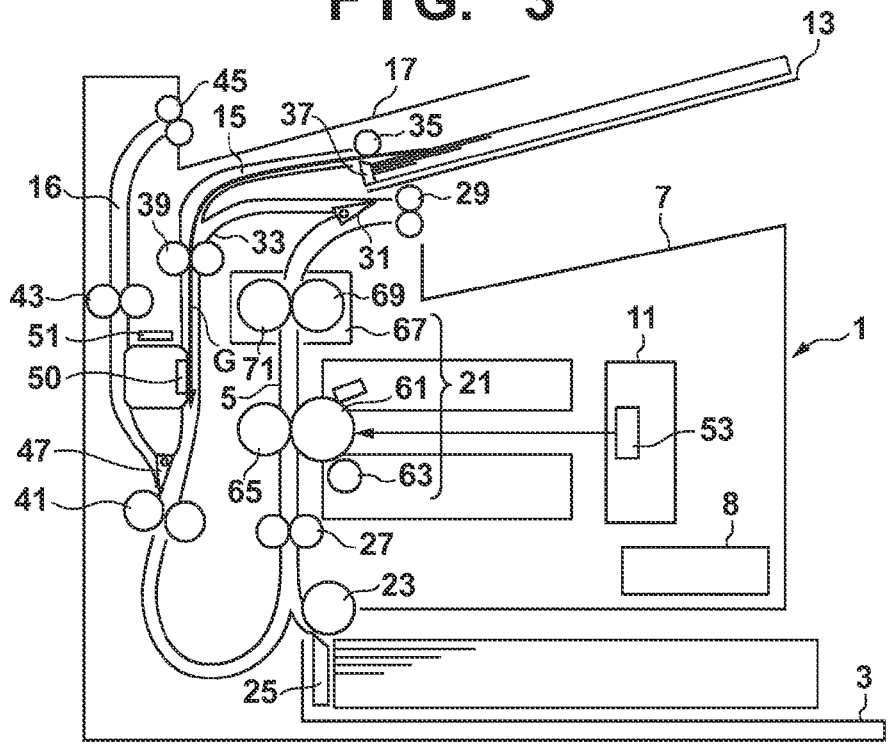
FIG. 3 is a diagram illustrating an operation for starting the reading of image information for a first side of an original according to the first embodiment.
Figure 4:
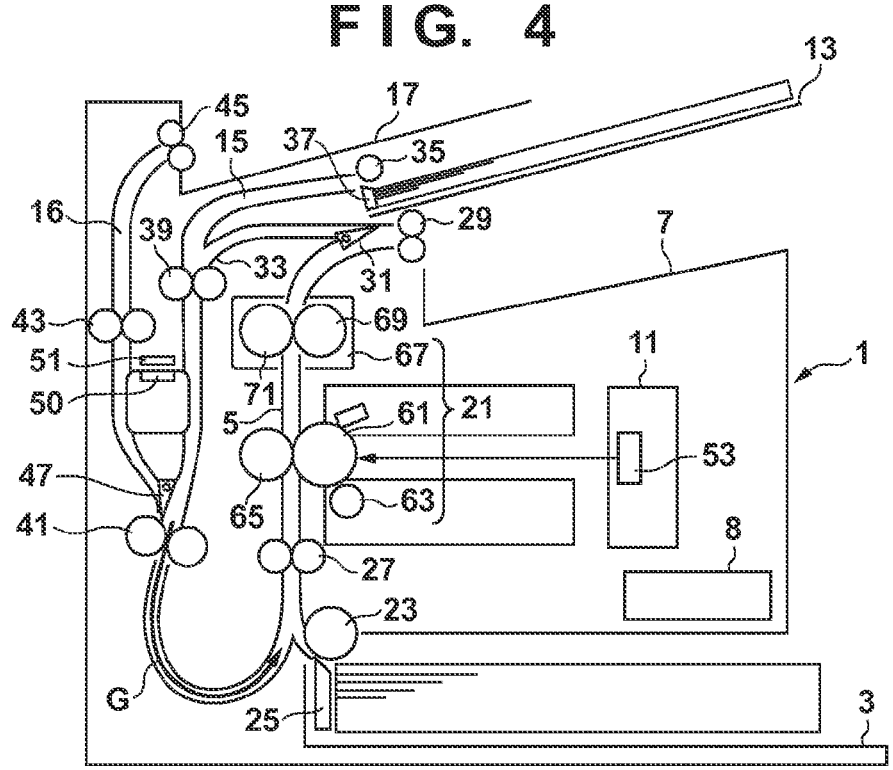
FIG. 4 is a diagram illustrating an operation for conveying the original to an original conveyance path from a reverse conveyance path according to the first embodiment.
Figure 5:
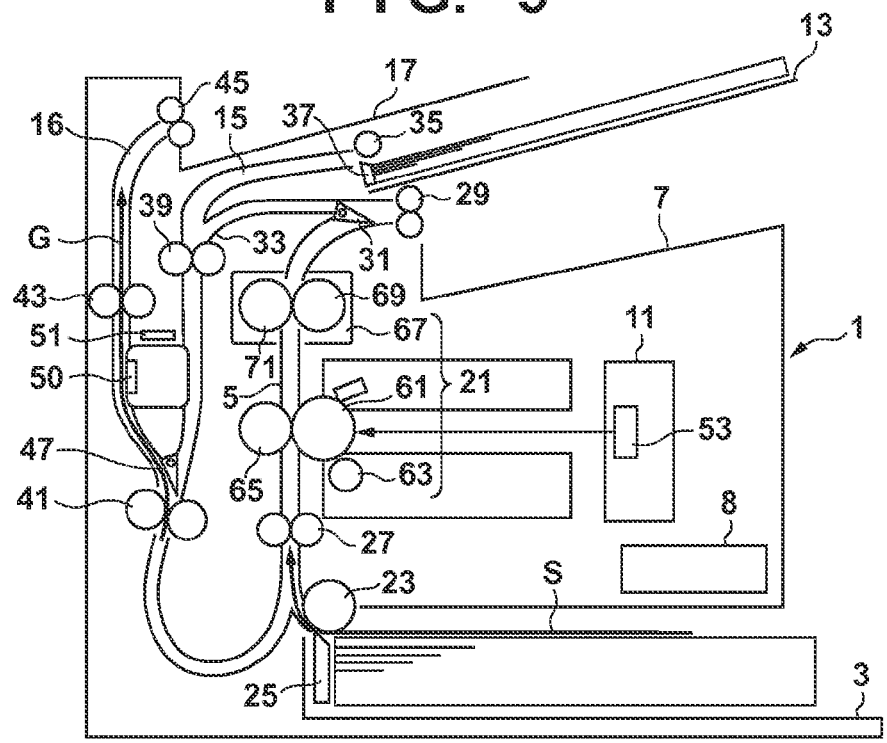
FIG. 5 is a diagram illustrating an operation for starting the reading of image information for a second side of the original according to the first embodiment.

Both ends of the reverse conveyance path 33 are connected to the recording material sheet conveyance path 5 at the positions of the conveyance rollers 27 and the sheet discharge rollers 29. The original conveyance path 15 is provided with an image scanning unit 50, and with a white reference member 51 at a position at which it faces the image scanning unit 50. The image scanning unit 50 is configured to move in a circulating manner as shown in FIGS. 3 to 5 and changes its scanning position by moving in a circulating manner, so as to be able to scan an image on the original conveyance paths 15 and 16. This operation will be described in detail later.

The optical unit 11 is provided with a light emitting unit 53 that emits laser light to the printing unit 21 upon receiving a print signal from the electric component 8. In the present embodiment, the optical unit 11 and the printing unit 21 constitutes a part of an image forming unit. The internal configuration of the electric component 8 will be described in detail later.

The printing unit 21 is constituted by a photoconductive drum 61, a development roller 63, a transfer unit 65, and a fixing unit 67. The fixing unit 67 is constituted by a heating roller 69 and a pressure roller 71. The photoconductive drum 61 is a rotatable image supporting member. The development roller 63 is positioned to be in contact with the photoconductive drum 61, and rotates while retaining toner. When the optical unit 11 has received a print signal, the light emitting unit 53 emits laser light to the surface of the rotating photoconductive drum 61. On the surface of the photoconductive drum 61 irradiated with laser light, an electrostatic latent image is formed by an electric charge. By the development roller 63 rotating and suppling toner to the electrostatic latent image formed on the surface of the photoconductive drum 61, a toner image is formed on the surface of the photoconductive drum 61. The transfer unit 65 that transfers this toner image onto the recording material sheet S is positioned to be in contact with the photoconductive drum 61.

The recording material sheets S that are accommodated in the first sheet feed unit 3 are conveyed one by one to the conveyance rollers 27 of the recording material sheet conveyance path 5 by the CST pickup roller 23 and the separating unit 25. In FIG. 1, the arrow with a bold line denotes a recording material sheet S and its traveling direction. The conveyance rollers 27 adjust the timing so that the front end of the toner image on the surface of the photoconductive drum 61 matches the front end of the recording material sheet S, and conveys the recording material sheet S to the transfer unit 65.

The toner image travels to the transfer unit 65 by rotation of the photoconductive drum 61, and is transferred onto the recording material sheet S by a bias and a pressure that are applied to the transfer unit 65. The transfer unit 65 conveys the recording material sheet S to the fixing unit 67. In the fixing unit 67, the toner image is fixed to the recording material sheet S by heat from the rotatable heating roller 69 and the pressure from the pressure roller 71. The recording material sheet S to which the toner image is fixed is conveyed to the sheet discharge rollers 29. In the case of single-sided printing, the sheet discharge rollers 29 discharges the recording material sheet S to the first sheet discharge unit 7. In the case of double-sided printing, the recording material sheet S is conveyed from the sheet discharge rollers 29 to the reverse conveyance path 33 connected to the recording material sheet conveyance path 5.

The following will describe the details of the electric component 8, the image scanning unit 50, and an operation unit 805 of the image forming apparatus 1. FIG. 9 is a diagram illustrating an internal configuration of the electric component 8 of the image forming apparatus 1 according to the present embodiment. The internal configuration of the electric component 8 will be described with reference to FIG. 9. On the inside of the electric component 8, units are provided that are controlled by a CPU 801, which is an example of control unit.

The CPU 801 is connected, via an application specific integrated circuit (ASIC) 802, to the light emitting unit 53, which includes a polygonal mirror, a motor, a laser light emitting element, and the like. The ASIC 802 is used for reducing a control load of the CPU 801. The CPU 801 transmits a control signal to the ASIC 802, and controls the light emitting unit 53 to emit laser light to scan the surface of the photoconductive drum 61, in order to form a desired electrostatic latent image.

The CPU 801 is connected to a program memory 803 via a bus or the like. In the program memory 803, programs and data for use in executing a part or all of the processing executed by the CPU 801 are stored. That is, the CPU 801 uses the programs and data stored in the program memory 803 so as to execute various types of processing. The ASIC 802 controls the image scanning unit 50 in accordance with an instruction of the CPU 801, and stores image information read by the image scanning unit 50 in an image memory 804.

The CPU 801 further controls a high-voltage power source unit 810 that controls electric charging, development, transfer and the like that are needed for electro-photographic process, and controls a power source unit 811 that controls fixation. Furthermore, the CPU 801 monitors the temperature using a thermistor (not shown) provided on the fixing unit 67, and performs control to maintain the fixing temperature as constant. The CPU 801 controls driving systems such as a double-sided flapper solenoid 820 and a switchback solenoid 821. Furthermore, the CPU 801 transmits a control signal to the ASIC 802 to control driving systems such as a CST sheet feed solenoid 822, a CIS sheet feed solenoid 823, a main motor 830, and a double-sided driving motor 840, in order to convey a recording material sheet S. The main motor 830 drives the CST pickup roller 23, the conveyance rollers 27, the photoconductive drum 61, the transfer unit 65, the heating roller 69, the pressure roller 71, and the like. When driving of a sheet feeding roller for feeding the recording material sheet S is started, the CST sheet feed solenoid 822 is turned on so as to drive the CST pickup roller 23. The double-sided driving motor 840 drives the CIS pickup roller 35, the conveyance rollers 39, 41, and 43, and the sheet discharge rollers 45.

The ASIC 802 performs control of the speed of the motor provided on the inside of the light emitting unit 53, the speed of the main motor 830, and the speed of the double-sided driving motor 840, in accordance with an instruction of the CPU 801. In such motor speed control, tack signals are detected from each of the above-described motors, and an acceleration signal or a deceleration signal is transmitted to the motor so that the interval between the tack signals is a predetermined time. Tack signals are pulse signals that are output from the motors each time the motors are rotated.

The CPU 801 is connected to the operation unit 805 that includes a display such as a touch panel, and operation keys. The CPU 801 controls the operation unit 805 to display an operation screen, receives a command from a user via the operation unit 805, and performs other operations. Upon receiving, for example, a copy command from the operation unit 805 or a print command from a host computer (not shown), the CPU 801 drives the main motor 830 and the double-sided driving motor 840 so as to convey the recording material sheet S. After the toner image formed on the surface of the photoconductive drum 61 is transferred onto the recording material sheet S by the transfer unit 65 and is fixed to the recording material sheet S by the fixing unit 67, the recording material sheet S is discharged to the first sheet discharge unit 7. In order to improve the alignment property of the recording material sheet S subjected to image formation, the first sheet discharge unit 7 is inclined slightly upward away from the vicinity of the sheet discharge outlet in the direction in which the recording material sheet S is discharged. The CPU 801 controls the power source unit 811 to supply predetermined electric power to the fixing unit 67, and the fixing unit 67 generates a predetermined amount of heat, supplies the generated amount of heat to the recording material sheet S, fuses the toner image on the recording material sheet S, and fixes the toner image to the recording material sheet S.

The CPU 801 drives the double-sided driving motor 840 when having received a copy command from the operation unit 805 or a scan command from the host computer (not shown). The torque of the double-sided driving motor 840 is transmitted to the CIS pickup roller 35, and the CIS pickup roller 35 conveys the original G. The image scanning unit 50 is connected to the ASIC 802 via signal lines 860 and 870, and communicates with the ASIC 802 via the signal lines 860 and 870.

Figure 10:
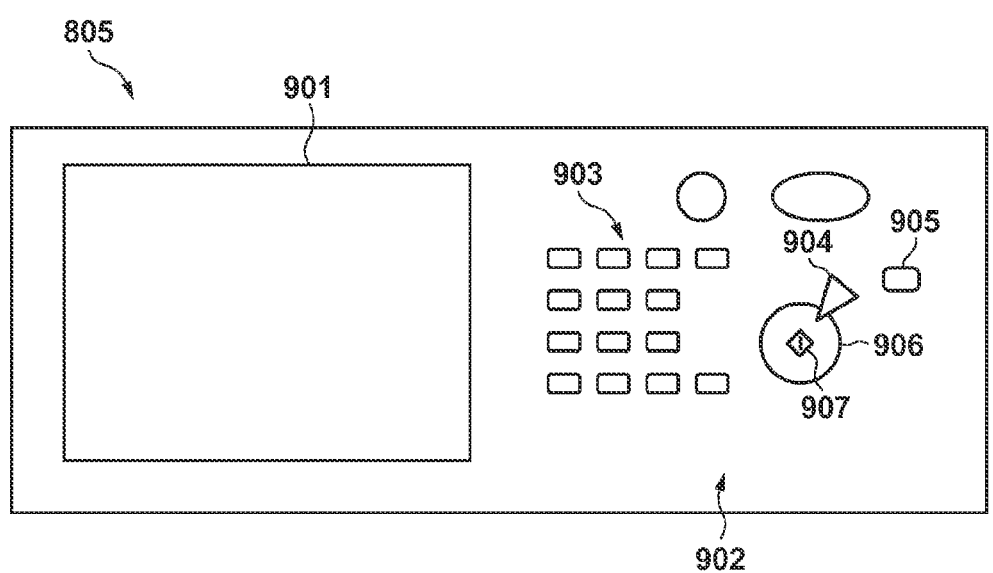
FIG. 10 is an example of a configuration of an operation unit according to the first embodiment.

FIG. 10 is a diagram illustrating an example of the operation unit 805 according to the present embodiment. A display unit 901 is configured by a liquid crystal display to which a touch panel sheet is attached, and displays an operation screen and soft keys. When a soft key is pressed, the display unit 901 transmits positional information indicating the pressed position to the CPU 801. The CPU 801 determines the command from the user based on this positional information.

A keyboard 902 includes a numerical keypad 903, a stop key 904, a user mode key 905, and a start key 906. The numerical keypad 903 includes keys for inputting numbers and characters, and is used for setting the number of sets of copies or switching the screen. The stop key 904 is a key for stopping the currently running operation. The user mode key 905 is a key for configuring setting of the image forming apparatus 1. The start key 906 is a key for instructing the start of reading or printing of image information. In the center of the start key 906, there is an LED unit 907 capable of emitting light in two colors. For example, when the LED unit 907 emits green light, this shows that the start key 906 is usable, and when the LED unit 907 emits red light, this shows that the start key 906 is not usable.

Figure 11:
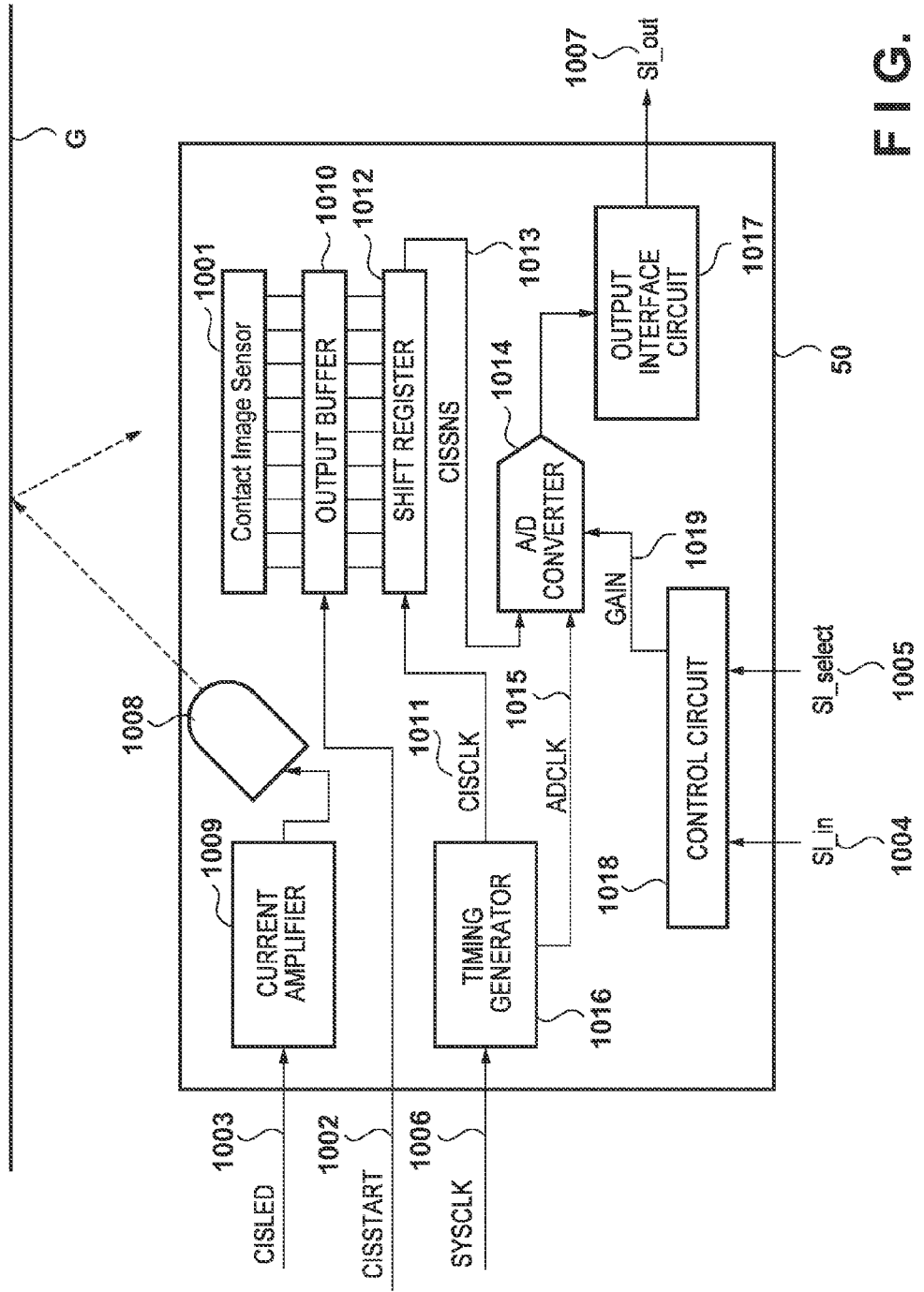
FIG. 11 is a diagram illustrating an example of a configuration of an image scanning unit according to the first embodiment.

FIG. 11 is a diagram illustrating an example of a configuration of the image scanning unit 50 according to the present embodiment. In FIG. 11, an example of a circuit block of a CIS 1001 is shown. In the CIS 1001, photodiodes of, for example, 10,368 pixels are arranged in an array in a specific main scanning density (for example, 1,200 dpi).

The image scanning unit 50 receives, from the ASIC 802, a start pulse (CISSTART) signal 1002, a light-emitting-element control (CISLED) signal 1003, and an Sl_in signal 1004. The image scanning unit 50 further receives, from the ASIC 802, an Sl_select signal 1005, and a system clock (SYSCLK) signal 1006 that determines the operation speed of the CIS. Note that the CISSTART signal 1002, the CISLED signal 1003, the Sl_in signal 1004, the Sl_select signal 1005, and the SYSCLK signal 1006 are transmitted via the signal line 860 (see FIG. 9) that connects the image scanning unit 50 and the ASIC 802. Furthermore, the image scanning unit 50 transmits an Sl_out signal 1007 to the ASIC 802. The Sl_out signal 1007 is transmitted via the signal line 870 (see FIG. 9) that connects the image scanning unit 50 and the ASIC 802.

A light-emitting element 1008 emits light based on a current that is amplified by a current amplifier 1009, and uniformly irradiates the original G.

When the CISSTART signal 1002 is active, the CIS 1001 starts accumulation of an electric charge based on the received light, and sequentially sets data in an output buffer 1010. When a transfer clock (CISCLK) signal 1011 is applied to a shift register 1012, the shift register 1012 transfers, as a CISSNS signal 1013, the data set in the output buffer 1010 to an A/D converter 1014. The CISCLK signal 1011 has the frequency of, for example, 500 kHz to 1 MHz.

The CISSNS signal 1013 has a predetermined data security area, and thus is sampled after a predetermined time has elapsed since a rising timing of the CISCLK signal 1011. The CISSNS signal 1013 is output in synchronization with both rising and falling edges of the CISCLK signal 1011. A CIS sampling clock (ADCLK) signal 1015 that determines the sampling rate of the A/D converter 1014 is generated so as to have a frequency twice as high as the frequency of the CISCLK signal 1011. The CISSNS signal 1013 is thus sampled by the rising edge of the ADCLK signal 1015. A timing generator 1016 frequency-divides the SYSCLK signal 1006 so as to generate the ADCLK signal 1015 and the CISCLK signal 1011. The phase of the ADCLK signal 1015 is delayed by the data security area with respect to the CISCLK signal 1011.

The CISSNS signal 1013 that was subjected to digital conversion by the A/D converter 1014 is transmitted as the Sl_out signal 1007 by an output interface circuit 1017 at a predetermined timing. The Sl_out signal 1007 is serial data. In this case, the CISSNS signal 1013 corresponding to a predetermined number of pixels from the CISSTART signal 1002 is an analog output reference voltage, and thus is not used as effective pixels.

A control circuit 1018 can variably control, via a GAIN 1019, an A/D conversion gain of the A/D converter 1014 in accordance with the Sl_in signal 1004 and the Sl_select signal 1005. For example, when the contrast of an image is not appropriately acquired, the control circuit 1018 is instructed to increase the A/D conversion gain of the A/D converter 1014 so as to improve the contrast. Accordingly, it is possible to change the contrast of the image to an appropriate value.

The description has been given using an example in which all pixels are output one by one as the CISSNS signal 1013 with reference to FIG. 11. However, in order to scan the image at high speed, it is also possible to divide the multiple pixels into a plurality of areas and to subject the areas to A/D conversion in parallel. Furthermore, in FIG. 11, the CIS 1001 is used as an image sensor for scanning an image. However, a CMOS sensor or a CCD sensor may be used.

Hereinafter, a printing operation with respect to a recording material sheet S, and a scanning operation and an information adding and printing operation with respect to an original G, which are performed in the image forming apparatus 1, will be described with reference to FIGS. 2 to 8.

Figure 2:
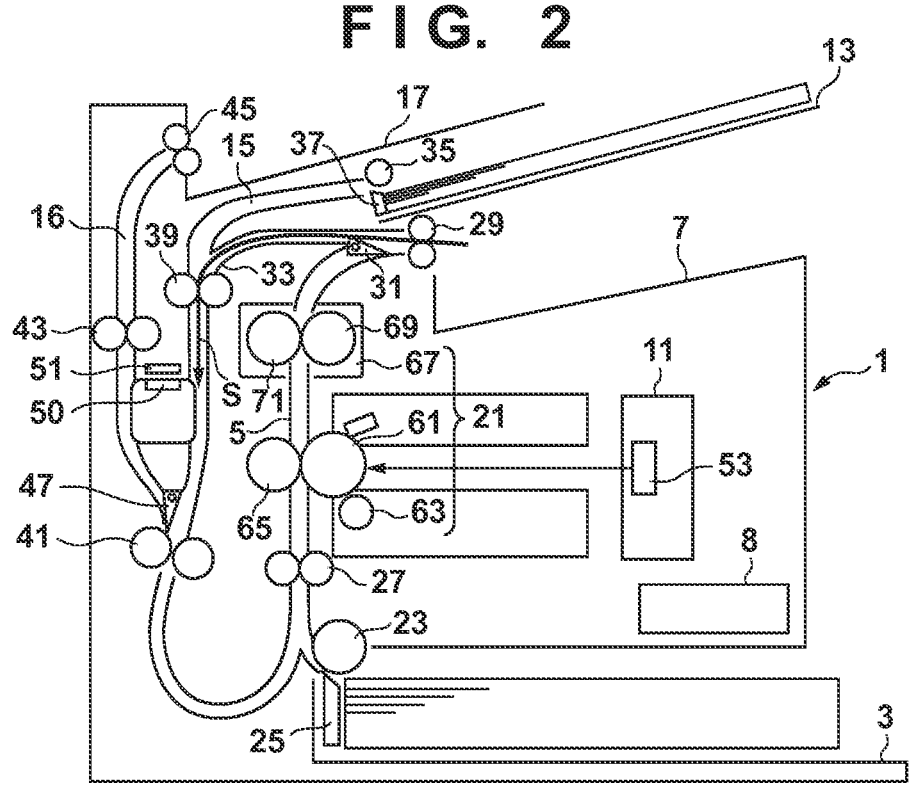
FIG. 2 is a diagram illustrating processing of double-sided printing according to the first embodiment.

FIG. 2 is a diagram illustrating processing of double-sided printing according to the present embodiment. First, a recording material sheet S accommodated in the first sheet feed unit 3 is conveyed by the CST pickup roller 23 and the conveyance rollers 27, passes through the transfer unit 65 thereby having a toner image fixed to its front side, and is conveyed to the sheet discharge rollers 29. Then, when the rear end of the recording material sheet S passes by the double-sided flapper 31, the double-sided flapper 31 switches the conveyance path from the recording material sheet conveyance path 5 to the reverse conveyance path 33. Then, the sheet discharge rollers 29 rotate in the reverse direction, and convey the recording material sheet S to the reverse conveyance path 33. The recording material sheet S is conveyed to a scanning position of the image scanning unit 50 by the conveyance rollers 39. Then, the recording material sheet S is conveyed again to the transfer unit 65 by the conveyance rollers 41 and the conveyance rollers 27. After a toner image has been transferred and fixed to the reverse side of the recording material sheet S, the recording material sheet S is discharged to the first sheet discharge unit 7.

Processing for double-sided copying according to the present embodiment will be described with reference to FIGS. 3 to 7. Note that in the present embodiment, a first side is assumed to be the front side of the original G and a second side is assumed to be the reverse side thereof, but it is also possible that the first side is assumed to be the reverse side and the second side is assumed to be the front side, and it is not essential which of the first side and the second side of the original G is the front side or the reverse side. Furthermore, the example of the original G that is subjected to double-sided printing is shown, but the present invention is also applicable to the case of the original G that is subjected to single-sided printing.

FIG. 3 is a diagram illustrating the operation in which an original G is conveyed from the second sheet feed unit 13 to the original conveyance path 15 and reading of image information of the first side of the original G is started, according to the present embodiment. In FIG. 3, the arrow with the bold line denotes the original G and its traveling direction. Furthermore, the description will be given assuming that the first side refers to the upper side of the original G loaded on the second sheet feed unit 13. The sheets of the original G accommodated in the second sheet feed unit 13 are conveyed one by one to the conveyance rollers 39 by the CIS pickup roller 35 and the separating unit 37. Before starting reading of image information of the first side of the corresponding sheet of the original G, the image scanning unit 50 calculates the shading compensation coefficient for correcting a variation in output level of an image signal due to sensitivity unevenness of the CIS 1001, unevenness of the light-emitting element 1008, or the like. The shading compensation makes it possible to remove unevenness from an image having density (brightness) unevenness, so that the image has uniform brightness. The shading compensation coefficient is calculated based on a white reference image and a black reference image at a position at which the image scanning unit 50 and the white reference member 51 face each other. Here, the white reference image is obtained by the light-emitting element 1008 emitting light to the white reference member 51, and the black reference image is scanned by the image scanning unit 50 in the state in which the light-emitting element 1008 does not emit light.

The image scanning unit 50 sets the calculated shading compensation coefficient as a new shading compensation coefficient. Then, the image scanning unit 50 moves to the position at which it faces the reverse conveyance path 33 included in the original conveyance path 15. The conveyance rollers 39 convey the original G to a scanning position of the image scanning unit 50, and the image scanning unit 50 reads image information of the first side of the original G. The read image information of the first side of the original G is stored in the image memory 804 provided in the electric component 8. Note that the white reference member 51 is positioned so as to face downward in the image forming apparatus 1, preventing dust from being attached thereto.

Furthermore, the white reference member 51 is used as the reference member, but the reference member may be of a color other than white.

FIG. 4 is a diagram illustrating the operation in which after the reading of the image information of the first side of the original G has been completed, the original G is conveyed to the original conveyance path 16 from the reverse conveyance path 33, according to the present embodiment.

On the reverse conveyance path 33, the reading of image information of the first side of the original G is started, and the original G that has passed by the image scanning unit 50 is conveyed to the conveyance rollers 41. The conveyance rollers 41 are stopped at the position at which the rear end of the original G has passed by the switchback flapper 47. At that time, the original G is held in the state of being sandwiched between the conveyance rollers 41 until a predetermined time period elapses. During this predetermined time period, the switchback flapper 47 switches the conveyance path from the reverse conveyance path 33 to the original conveyance path 16. After the predetermined time period has elapsed, the conveyance rollers 41 convey the original G to the original conveyance path 16.

Furthermore, after the reading of image information of the first side of the original G is completed, the image scanning unit 50 moves to the position at which it faces the arrangement position of the white reference member 51. Here, the position of the image scanning unit 50 at which it faces the white reference member 51 is located on the movement track of the image scanning unit 50. At the position at which the image scanning unit 50 and the white reference member 51 face each other, the shading compensation coefficient is calculated based on the white reference image and the black reference image. The image scanning unit 50 sets the calculated shading compensation coefficient as a new shading compensation coefficient.

FIG. 5 is a diagram illustrating the operation in which after the original G has been conveyed from the reverse conveyance path 33 to the original conveyance path 16, reading of image information of the second side of the original G is started and a recording material sheet S is conveyed from the first sheet feed unit 3 to the recording material sheet conveyance path 5, according to the present embodiment. The original G is held in the state of being sandwiched between the conveyance rollers 41 until a predetermined time period elapses. At the same time when the switchback flapper 47 switches the conveyance path for the original G from the reverse conveyance path 33 to the original conveyance path 16, the image scanning unit 50 moves to the position at which it faces the original conveyance path 16. The conveyance rollers 41 rotate in the reverse direction, and the original G is conveyed through the original conveyance path 16 to the image scanning unit 50. When the original G passes by the image scanning unit 50, the image scanning unit 50 reads image information of the second side of the original G. The read image information of the second side of the original G is stored in the image memory 804 provided in the electric component 8.

In addition, the recording material sheets S accommodated in the first sheet feed unit 3 are conveyed one by one to the conveyance rollers 27 that are provided on the recording material sheet conveyance path 5. Substantially the same time as the conveyance, the light emitting unit 53 emits laser light to the surface of the photoconductive drum 61 based on the image information of the second side of the original G stored in the image memory 804, and thereby an electrostatic latent image is formed on the surface of the photoconductive drum 61. The electrostatic latent image formed on the surface of the photoconductive drum 61 is developed by the development roller 63 as a toner image. The transfer unit 65 transfers the developed toner image onto the corresponding recording material sheet S, the fixing unit 67 fixes the toner image to the recording material sheet S, and thereby image formation based on the image information of the second side of the original G is completed. In FIG. 5, the conveyance of the recording material sheet S is started at the same time as the reading of image information of the second side of the original G, but it is also possible that the conveyance of the recording material sheet S is started after the reading of image information on the second side of the original G is completed.

Figure 6:
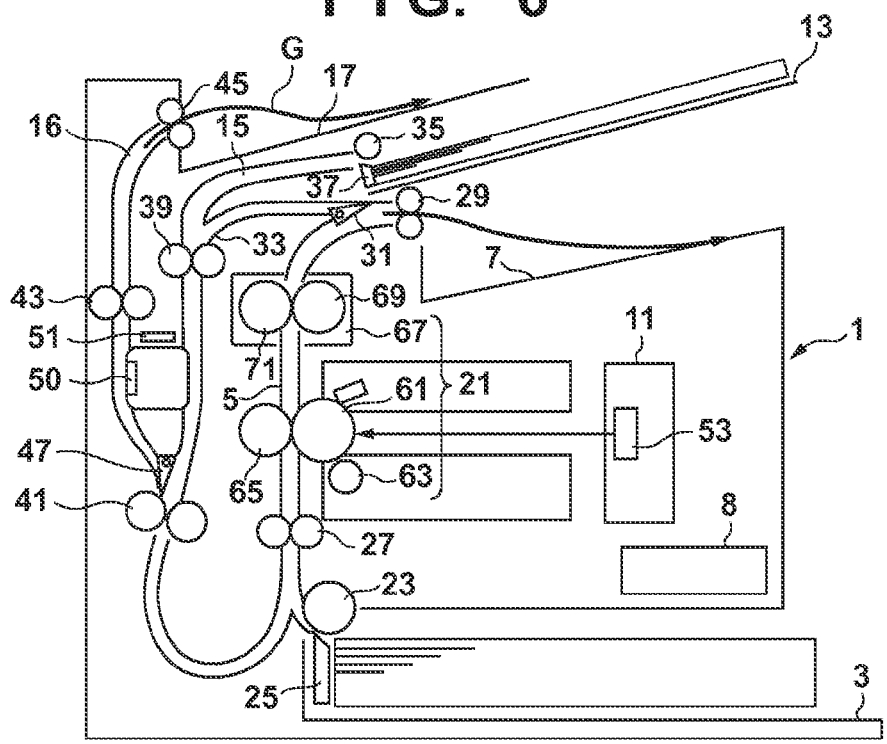
FIG. 6 is a diagram illustrating an operation for discharging the original to a second sheet discharge unit from the original conveyance path according to the first embodiment.

FIG. 6 is a diagram illustrating the operation in which after the reading of image information of the second side of the original G has been completed, the original G is discharged from the original conveyance path 16 to the second sheet discharge unit 17, and a recording material sheet S is conveyed to the reverse conveyance path 33 from the recording material sheet conveyance path 5, according to the present embodiment. The original G whose image information on its second side was read on the original conveyance path 16 is discharged to the second sheet discharge unit 17 by the conveyance rollers 43 and the sheet discharge rollers 45. When the rear end of the original G has passed by the switchback flapper 47, the switchback flapper 47 switches the conveyance path from the original conveyance path 16 to the reverse conveyance path 33. The recording material sheet S on which an image of the second side of the original G is completely formed is conveyed by reverse rotation of the sheet discharge rollers 29 toward the reverse conveyance path 33 set by switching of the double-sided flapper 31.

FIG. 7 is a diagram illustrating image formation based on the image information of the first side of the original G, according to the present embodiment. After the rear end of the recording material sheet S on which an image of the second side of the original G is completely formed has passed by the double-sided flapper 31, the double-sided flapper 31 switches the conveyance path from the recording material sheet conveyance path 5 to the reverse conveyance path 33. Thereafter, the sheet discharge rollers 29 rotate in the reverse direction and convey the recording material sheet S to the reverse conveyance path 33. The recording material sheet S conveyed to the reverse conveyance path 33 passes by the image scanning unit 50, is conveyed by the conveyance rollers 41 to the conveyance rollers 27, and is further conveyed by the conveyance rollers 27 to the transfer unit 65. In FIG. 7, the arrow with the dotted line shows the state of conveyance of the recording material sheet S. The light emitting unit 53 emits laser light to the surface of the photoconductive drum 61 based on the image information of the first side of the original G that is stored in the image memory 804, and an electrostatic latent image is formed on the surface of the photoconductive drum 61. The electrostatic latent image formed on the surface of the photoconductive drum 61 is developed by the development roller 63 as a toner image. The transfer unit 65 transfers the developed toner image onto the recording material sheet S, the fixing unit 67 fixes the toner image to the recording material sheet S, and thereby image formation based on the image information on the first side of the original G is completed. Then, the recording material sheet S is discharged to the first sheet discharge unit 7 by the sheet discharge rollers 29.

FIG. 8 is a diagram illustrating processing in which image information of both the first and second sides of the original G is read, and characters or the like are printed on both sides of the read original G, according to the present embodiment (information adding and printing processing). First, the sheets of the original G accommodated in the second sheet feed unit 13 are conveyed one by one to the conveyance rollers 39 by the CIS pickup roller 35 and the separating unit 37. The image scanning unit 50 calculates the shading compensation coefficient. The operation of the shading compensation is the same as that described with reference to FIG. 3. The sheet of the original G that has passed by the image scanning unit 50 is conveyed to the conveyance rollers 41. The conveyance rollers 41 are stopped when the rear end of the original G has passed by the switchback flapper 47. Accordingly, the original G is held in the state of being sandwiched between the conveyance rollers 41. After a predetermined time period has elapsed, the original G is conveyed to the original conveyance path 16.

At the same time when the switchback flapper 47 switches the conveyance path from the reverse conveyance path 33 to the original conveyance path 16, the image scanning unit 50 moves to the position at which it faces the original conveyance path 16. By the conveyance rollers 41 rotating in the reverse direction, the original G is conveyed to the image scanning unit 50 along the original conveyance path 16. By the original G being conveyed to and passing by the image scanning unit 50, the image scanning unit 50 reads image information of the second side of the original G. The read image information of the second side of the original G is stored in the image memory 804. By the above-described control, reading of image information on both sides of the original G is completed.

Information adding and printing to the original G whose image information has been read completely are performed by the control below. In this context, "Information adding and printing" refers to the processing in which new image information is additionally printed on an original G on which an image was printed in advance. First, the original G is conveyed to the conveyance rollers 43 and the sheet discharge rollers 45. The sheet discharge rollers 45 are stopped when the rear end of the original G has passed by the image scanning unit 50. Accordingly, the original G is held in the state of being sandwiched between the sheet discharge rollers 45. When the sheet discharge rollers 45 rotate in the reverse direction after a predetermined time period has elapsed, the original G is conveyed along the original conveyance path 16 and conveyed by the conveyance rollers 41 to the conveyance rollers 27. The conveyance rollers 27 convey the original G to the transfer unit 65 at a timing such that the position of the front end of a toner image on the surface of the photoconductive drum 61 matches the front end position of the original G.

By rotation of the photoconductive drum 61, the toner image is transferred onto the original G by a bias and a pressure that are applied to the transfer unit 65. Furthermore, the transfer unit 65 conveys the original G to the fixing unit 67. In the fixing unit 67, the toner image is fixed to the original G by heat from the rotatable heating roller 69 and a pressure of the pressure roller 71, which opposes the heating roller 69 and is rotatable. The original G onto which the toner image was fixed is conveyed to the sheet discharge rollers 29. The sheet discharge rollers 29 are stopped when the rear end of the original G has passed by the double-sided flapper 31, and the double-sided flapper 31 performs switching so that the original G is conveyed in the direction of the conveyance rollers 39. After a predetermined time period has elapsed, by the sheet discharge rollers 29 rotating in the reverse direction, the original G is conveyed to the conveyance rollers 39 in the state in which the sheet is turned over from the first side to the second side. Subsequently, the original G is conveyed to the transfer unit 65 and the fixing unit 67 by the conveyance rollers 41 and the conveyance rollers 27, and a toner image is printed thereon. Then, the original G is conveyed to the sheet discharge rollers 29, and the sheet discharge rollers 29 discharge the original G to the first sheet discharge unit 7. Accordingly, the image information on both sides of the original G is read, and both sides of the read original G information are subjected to information adding and printing.

Figure 12:
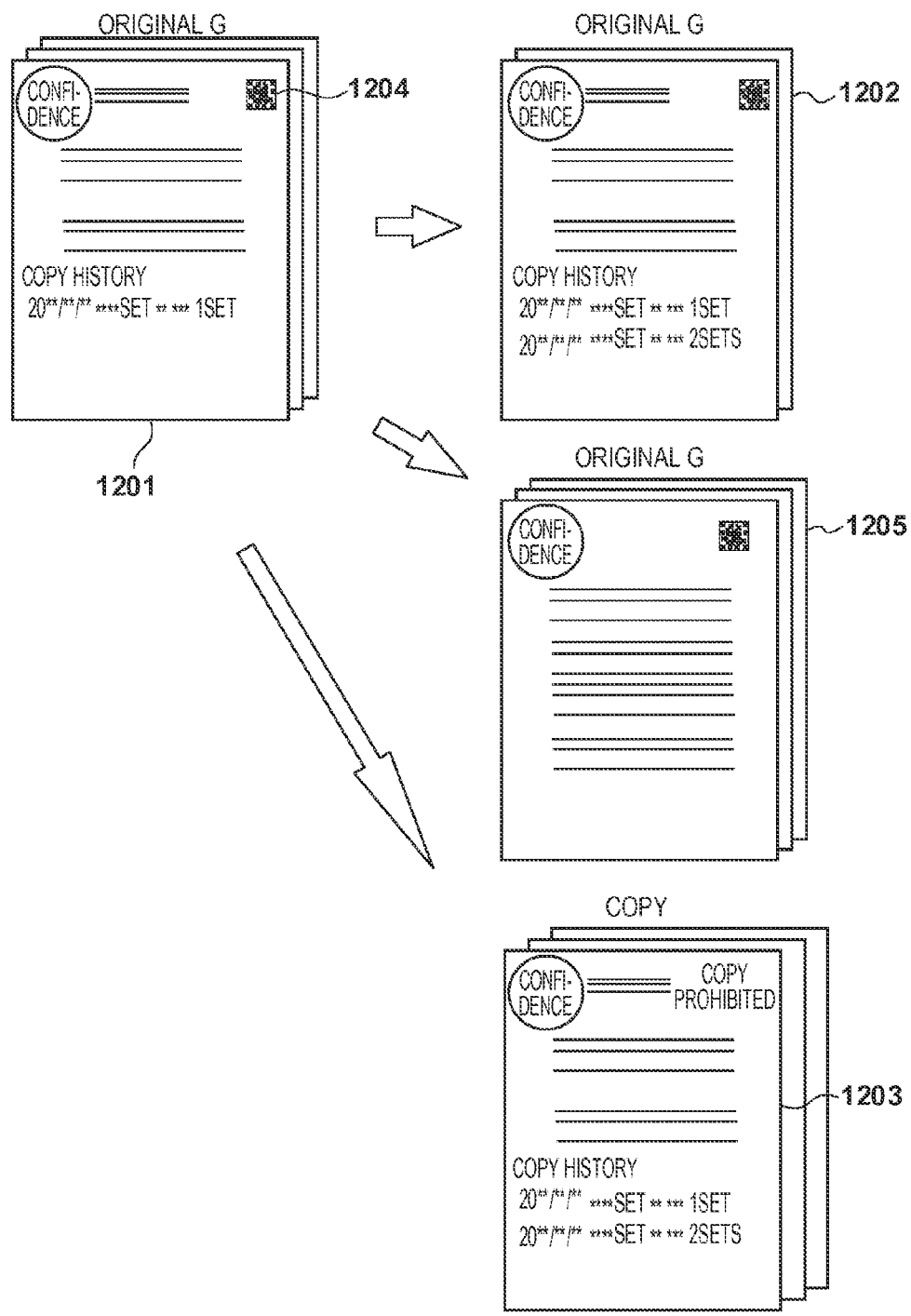
FIG. 12 is a diagram illustrating the adding of copy history information to an original according to the first embodiment.

FIG. 12 illustrates an example of processing for adding and printing copy history information when an original G is copied, according to the present embodiment. In FIG. 12, the reference numeral 1201 denotes an original G before copying. Furthermore, the reference numeral 1202 denotes an original G that was subjected to the adding and printing processing at the time of copying, the reference numeral 1205 denotes an original G that was not subjected to the adding and printing processing at the time of copying, and the reference numeral 1203 denotes a copy. As shown in FIG. 12, the copy history information is added to the original G 1202, and the same copy history information as that of the original G is also printed on the copy 1203. Furthermore, a two-dimensional bar-code 1204 represented by a QR code (registered trademark) or the like is printed in advance on the original G 1201, that is, the original G 1201 includes embedded information that is needed when the copy history information is added and printed to the original G as described above. For example, a configuration is also possible in which the first sheet of the original G constituted by a plurality of sheets corresponds to the original G 1202, and the second sheets onwards correspond to the original G 1205. Furthermore, a plurality of pages may correspond to the original G 1202.

In the present embodiment, processing for adding and printing copy history information is performed on an original G, based on information that a user embedded in advance into the original G using the two-dimensional bar-code 1204. Note that adding the two-dimensional bar-code 1204 to the original G is performed by a user using word-processing software for a personal computer or the like at the time of document creation of the original G. Table 1 shows examples of items of information that are to be embedded into the two-dimensional bar-code 1204. Note that, instead of the two-dimensional bar-code 1204, another method such as, for example, an electronic watermark or another pattern image may be used as a method into which information is embedded.

TABLE 1

| Items | Data examples |
| --- | --- |
| Whether it is copy history managed document or not? | YES or NO |
| Information on items to be added as copy history | Copy execution date<br>Name of person who has executed copying<br>Department of person who has executed copying<br>Set of copies |
| Information on total number of pages | 20 |
| Page number information | 1-20 |
| Page number on which copy history is to be added | 1, 4 |
| Information on position at which copy history is to be added | Lower margin |

TABLE 1-continued

| Items | Data examples |
| --- | --- |
| Option for information to be added to copy | Copy prohibited Redistribution prohibited Subject to shredding |

In the present embodiment, an example in which the characters "copy prohibited" is added to the copy 1203 is shown, but the present invention is not limited to this. For example, not only the characters but also, for example, a copy protection pattern may be added to the copy 1203. Furthermore, the adding of the copy history information to an original G may be performed using, instead of characters, a pattern such as a two-dimensional bar-code. Furthermore, in the present embodiment, an example in which the two-dimensional bar-code 1204 is not printed on the copy 1203 is shown, but a configuration is also possible in which the two-dimensional bar-code 1204 is printed thereon.

Processing Flow

Figure 13:
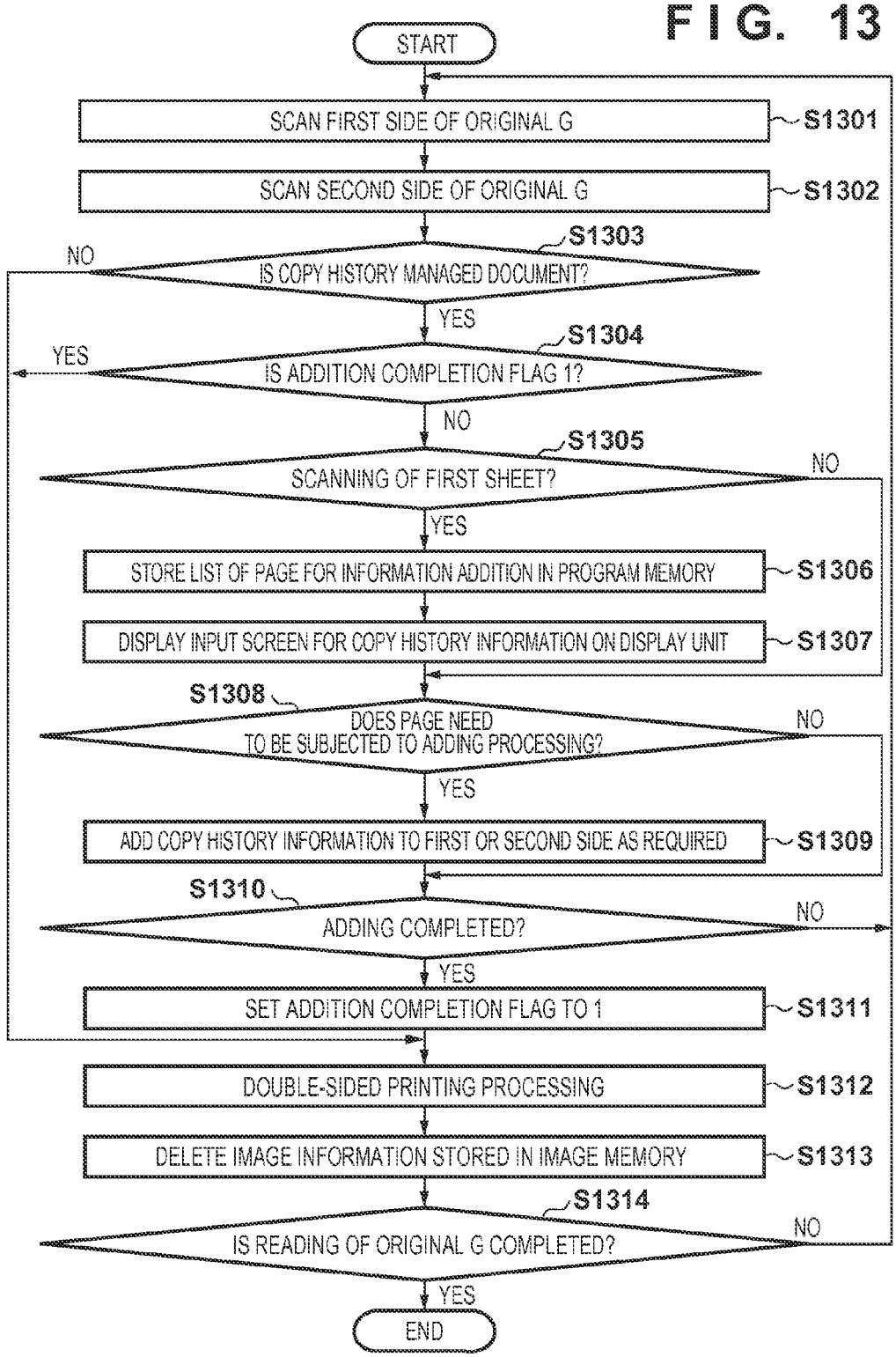
FIG. 13 is a flowchart illustrating control of the adding of copy history information to an original according to the first embodiment.

The following will describe control of the image forming apparatus 1 at the time of double-sided copying according to the present embodiment with reference to the flowchart of FIG. 13. In the present embodiment, it is determined that the adding of copy history information to an original G has been completed based on the information of the two-dimensional bar-code 1204, and then control for executing printing processing for a copy is performed. Note that the present embodiment shows an example in which user operations of the image forming apparatus 1 are performed in the operation unit 805, but the present invention is not limited to this and user operations may be executed via, for example, a device such as a personal computer or a mobile phone that is connected to the image forming apparatus 1. Furthermore, in the present embodiment, a description is given taking, as an example, a case of an original G having 20 pages in total with copy history information added to its first page on the first side and to its fourth page on the second side.

In step S1301, the image forming apparatus 1 performs processing for scanning the first side of the original G upon receiving a copy command from the operation unit 805. The image information of the read first side of the original G is stored in the image memory 804.

In step S1302, the image forming apparatus 1 performs processing for scanning the second side of the original G. The read image information of the second side of the original G is stored in the image memory 804.

In step S1303, the image forming apparatus 1 performs processing for analyzing the image information stored in the image memory 804, checks whether or not the two-dimensional bar-code 1204 is added to the original G, and determines based on the information of the two-dimensional bar-code 1204 whether or not the original G is a document whose copy history needs to be managed. If it is determined that the original G is a document whose copy history needs to be managed (hereinafter, referred to as "copy history managed document") (Yes in step S1303), the procedure advances to step S1304, whereas if it is determined that the original G is not a copy history managed document (No in step S1303), the procedure advances to step S1313.

In step S1304, the image forming apparatus 1 determines the state of an addition completion flag. The addition completion flag indicates whether or not the adding and printing of copy history information to the original G is completed, and when the addition completion flag has the value "1", this shows that the processing is completed, whereas when the addition completion flag has the value "0", this shows that the processing is not completed. The initial value of the addition completion flag is "0". If the addition completion flag is "1" (Yes in step S1304), the image forming apparatus 1 determines that the processing for adding and printing copy history information to the original G is completed, and the procedure advances to step S1312. On the other hand, if the addition completion flag is "0" (No in step S1304), the image forming apparatus 1 determines that the processing for adding and printing copy history information to the original G is not completed, and the procedure advances to step S1305.

In step S1305, the image forming apparatus 1 determines whether or not the image scanned in steps S1301 and S1302 is of the first sheet of the original G. If the image is of the first sheet of the original G (Yes in step S1305), the procedure advances to step S1306. If the image is of the second or subsequent sheet of the original G (No in step S1305), the image forming apparatus 1 skips input of copy history by the user, and the procedure advances to step S1308.

In step S1306, the image forming apparatus 1 creates a list of page numbers of the original G to which copy history management information needs to be added, based on the information on "page numbers on which copy history is to be added", which is shown in Table 1 and embedded into the two-dimensional bar-code 1204 of the original G, and stores the created list in the program memory 803. In the present embodiment, an example of the page number list is shown in Table 2 below.

TABLE 2

| List of page numbers on which copy history is to be added |
| --- |
| First page Fourth page |

Figures 14, 15:
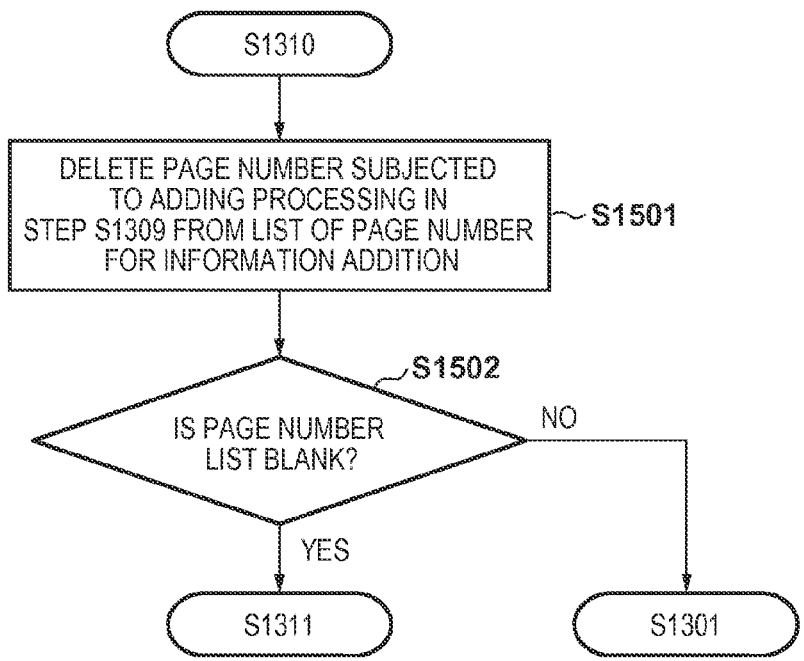
FIG. 14 is a diagram illustrating an example of a copy history information input screen that is displayed on the operation unit according to the first embodiment.
FIG. 15 is a flowchart illustrating control of the completion of the adding of copy history information to an original according to the first embodiment.

In step S1307, the image forming apparatus 1 displays, on the display unit 901, items that are needed to be input by the user, based on the two-dimensional bar-code 1204 that is printed on the original G. FIG. 14 illustrates an example of a configuration of a setting screen for accepting inputs by a user. In the present embodiment, as shown in FIG. 14, department and name are the items that are to be input by the user. Furthermore, the display on the display unit 901 is made so that the user can select items that are to be added and printed to a copy based on "option for information to be added to copy", which is shown in Table 1 and embedded into the two-dimensional bar-code 1204.

In step S1308, based on the information (the data shown in Table 2 in the present embodiment) on the two-dimensional bar-code 1204 of the original G that was scanned in step S1301 or S1302, the image forming apparatus 1 determines whether or not the scanned page of the original G is the page to which copy history information needs to be added. Specifically, if the page number of the scanned page of the original G matches the "page number on which copy history is to be added" in the information of the two-dimensional bar-code 1204 shown in Table 1, the image forming apparatus 1 determines that the scanned page is the page to which copy history information needs to be added. In the case of the present embodiment, history information is added to the first and fourth pages, and thus only if the page is the first or fourth page (Yes in step S1308), the procedure advances to step S1309, and otherwise (No in step S1308), the procedure advances to step S1310.

If it is determined in step S1308 that copy history information needs to be added to the original G, the image forming apparatus 1 performs, in step S1309, processing for adding and printing the copy history information to the first side or the second side of the original G, as described with reference to FIG. 8.

In step S1310, the image forming apparatus 1 determines whether or not the processing for adding and printing the copy history information to the necessary pages of the original G is completed, based on the "page number on which copy history is to be added" in the information of the two-dimensional bar-code 1204 that was scanned in step S1303. This determination processing will be described later with reference to the flowchart of FIG. 15. If the processing for adding and printing the copy history information to the necessary pages of the original G is completed (Yes in step S1310), the procedure advances to step S1311, whereas if the processing for adding and printing the copy history information to the necessary pages of the original G is not completed (No in step S1310), the procedure returns to step S1301, where the image forming apparatus 1 performs the processing for scanning the original G. In the present embodiment, when the adding and printing of the copy history information to the first and fourth pages are completed as shown in Table 1, the image forming apparatus 1 determines that the adding and printing to the original G is completed, and the procedure advances to step S1311.

In step S1311, the image forming apparatus 1 sets the addition completion flag to "1", and stores the set addition completion flag in the program memory 803.

In step S1312, the image forming apparatus 1 executes double-sided printing processing for a copy based on the image information of the original G stored in the image memory 804 in steps S1301 and S1302. In this case, image formation is performed such that the copy history information that was added in advance to the original G is also described on the copy. The operation of the double-sided printing processing is as described with reference to FIG. 2.

In step S1313, the image forming apparatus 1 deletes, from the image memory 804, the image information of the original G that is no longer necessary after the printing processing. Since printing of a copy based on the image information stored in the image memory 804 has been completed in step S1312, the image information is not necessary thereafter.

In step S1314, the image forming apparatus 1 determines whether or not scanning of the original G is completed. If it is determined that the scanning is completed (Yes in step S1314), the present processing flow ends. On the other hand, if it is determined that the processing for scanning the original G is not completed (No in step S1314), the procedure returns to step S1301, where the image forming apparatus 1 performs processing for scanning the original G.

Hereinafter, the processing for determining whether or not processing for adding and printing copy history information to the original G in step S1310 of FIG. 13 is completed will be described with reference to the flowchart of FIG. 15. Similarly to the description with reference to the flowchart of FIG. 13, a description is given taking, as an example, the case of an original G having 20 pages in total with copy history information added to its first page on the first side and to its fourth page on the second side.

In step S1501, the image forming apparatus 1 deletes, from the list of page numbers on which copy history is to be added, the page numbers of pages of the original G that were subjected to the adding processing in step S1309. In the present embodiment, when the adding processing with respect to the first and fourth pages is completed, the image forming apparatus 1 deletes the corresponding pages from the list of page numbers on which copy history is to be added of Table 1.

In step S1502, the image forming apparatus 1 determines whether or not all the pages of the list of page numbers on which copy history is to be added have been deleted. If all the pages of the list of page numbers on which copy history is to be added have been deleted (Yes in step S1502), the image forming apparatus 1 determines that the adding processing with respect to the original G is completed, and the processing advances to step S1311 of FIG. 13. Furthermore, if any page number remains in the list of page numbers on which copy history is to be added (No in step S1502), the image forming apparatus 1 determines that the adding processing with respect to the original G is not completed, and the procedure returns to step S1301 of FIG. 13, where scanning and information adding processing with respect to the original G are performed. Note that a method for determining whether or not the adding is completed in step S1310 may be changed depending on the information embedded in the two-dimensional bar-code 1204. For example, if the information that is needed for creating the list of page numbers on which copy history is to be added shown in Table 2 is not embedded in the two-dimensional bar-code 1204, it is possible to determine that the adding is completed when all of the scanning of the original G loaded on the second sheet feed unit 13 is completed.

As described above, according to the present embodiment, after it is determined that processing for adding copy history information to an original G is completed, a copy is printed. Accordingly, it is possible to control an execution timing of adding the copy history information to the original, and an execution timing of generating a copy based on the image information of the original, thereby improving the information security. Furthermore, it is possible to provide an effective configuration in view of downsizing of the apparatus and cost reduction.

Second Embodiment

The present embodiment will describe control in which a margin of an original G is detected and adding copy history information to the original G is automatically executed. Note that in the present embodiment, the same reference numerals are added to the same main configurations as those of the first embodiment, and descriptions thereof are omitted.

Table 3 shows examples of items of information that are embedded into the two-dimensional bar-code 1204 printed in advance on an original G according to the present embodiment. In addition to the information in Table 1, information on the character size of the copy history information is embedded in advance into the two-dimensional bar-code 1204. Similarly to the first embodiment, adding the two-dimensional bar-code 1204 to an original G is performed by a user using word-processing software for a personal computer at the time of document creation of the original G.

TABLE 3

| Items | Data examples |
| --- | --- |
| Whether it is copy history managed document or not? | YES or NO |

TABLE 3-continued

| Items | Data examples |
|---|---|
| Information on items to be added as copy history | Copy execution date<br>Name of person who has executed copying<br>Department of person who has executed copying<br>Set of copies |
| Information on total number of pages | 20 |
| Page number information | 1-20 |
| Page number on which copy history is to be added | 1, 4 |
| Information on position at which copy history is to be added | Lower margin |
| Character size of copy history information | 3.5 mm in height × 3.5 mm in width |
| Option for information to be added to copy | Copy prohibited<br>Redistribution prohibited<br>Subject to shredding |

Processing Flow

Figure 16:
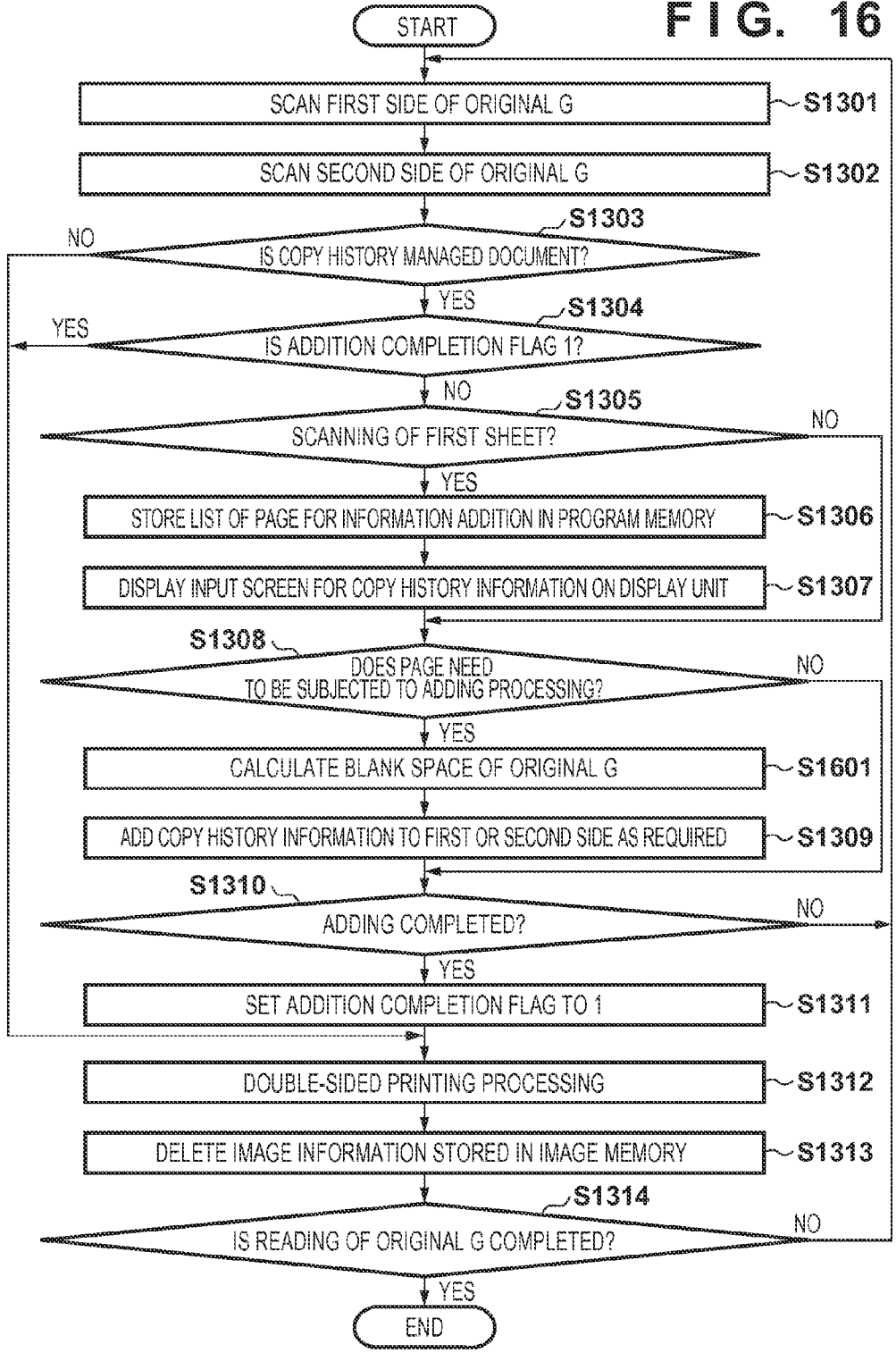
FIG. 16 is a flowchart illustrating control of the adding of copy history information to an original according to a second embodiment.

The following will describe the processing for adding copy history information to an original G at the time of double-sided copying of the image forming apparatus 1 according to the present embodiment with reference to the flowchart of FIG. 16.

In step S1601, the image forming apparatus 1 determines whether or not the original G has a space that is needed for adding copy history information, based on image data of the original G that was scanned in step S1301 or S1302. A blank space of the original G can be calculated by determining a white part of the image data and then obtaining the area of the determined white mass (marginal area). Note that the white part of the image data may be determined based on whether or not an RGB value of each pixel of the image data is a predetermined value or greater. Furthermore, the area of the blank space needed for the original G may be changed depending on the number of characters input by the user in step S1307 of FIG. 13. Furthermore, it is also possible to restrict to some extent the area in which copy history information is to be added. Furthermore, a copy history will be added to an area that is specified as the area to which the information is able to be added.

As described above, according to the present embodiment, a space to which information is to be added is obtained based on the image data of the scanned original G, and then copy history is added. Accordingly, it is possible to reliably add copy history information to the original G.

Third Embodiment

In the present embodiment, the possible number of times of adding copy history information to an original G is embedded into the two-dimensional bar-code 1204 added to the original G, and control that is performed when the possible number of times of the adding exceeds a predetermined value will be described. Note that in the present embodiment, the same reference numerals are added to the same main configurations as those of the first embodiment, and descriptions thereof are omitted.

Figure 17A:
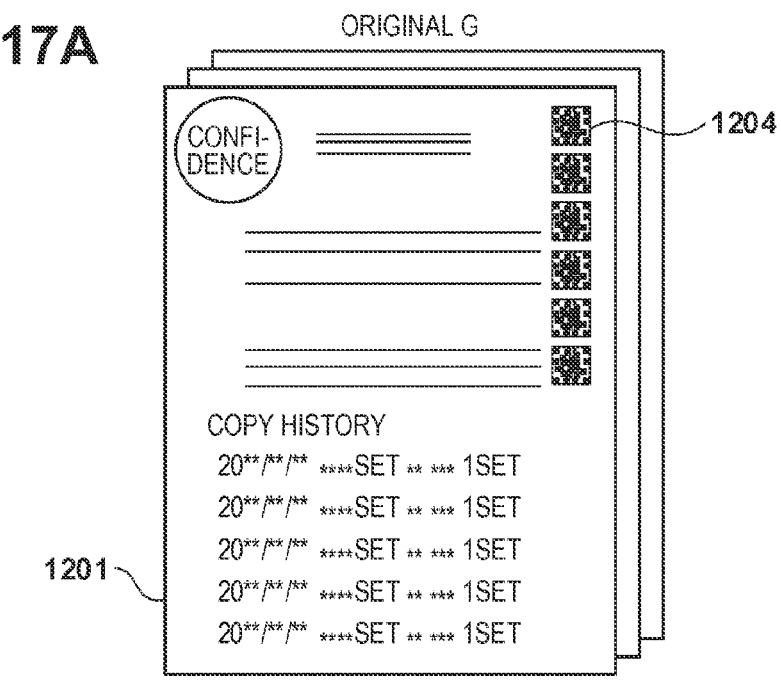
FIGS. 17A, 17B, 17C, and 17D are diagrams illustrating the adding of copy history information to an original according to a third embodiment.

FIGS. 17A to 17D show examples in the case where the number of times of adding copy history information to an original G exceeds a predetermined number, according to the present embodiment. In FIG. 17A, the reference numeral 1201 denotes an original G before copying. Furthermore, the reference numeral 1202 of FIG. 17B denotes an original G that was subjected to information adding and printing processing at the time of copying, the reference numeral 1205 of FIG. 17C denotes an original G that was not subjected to information adding and printing processing at the time of copying, and the reference numeral 1203 of FIG. 17D denotes a copy. FIGS. 17A to 17D show the case where the number of times of the adding copy history information to the original G exceeds the predetermined number of times, and the original G does not include a space for information addition. In other words, copy history is added five times to the original G 1202 of FIG. 17B, and thereafter there is no more area for information addition. In the present embodiment, control is performed for adding a page K for describing copy history (copy history description page K) for a new recording material sheet S. Furthermore, similarly to the original G, a new copy history description page K is also added to the copy.

Furthermore, together with information needed for adding copy history information to an original G, information on the possible number of times of adding copy history information (upper limit of the number of times that adding processing can be executed) is embedded into the two-dimensional bar-code 1204. Similarly to the first embodiment, adding the two-dimensional bar-code 1204 to the original G is performed by a user using word-processing software for a personal computer at the time of document creation of the original G. Table 4 shows examples of items of information that are to be embedded into the two-dimensional bar-code 1204 according to the present embodiment. Here, an example is shown in which the upper limit of the possible number of times of adding copy history information is assumed to be "5". Note that a method into which information is embedded is not limited to the two-dimensional bar-code 1204, but may be an electronic watermark, for example.

TABLE 4

| Items | Data examples |
|---|---|
| Whether it is copy history managed document or not? | YES |
| Copy history managed document ID number | ***** |
| Information on items to be added as copy history | Copy execution date<br>Name of person who has executed copying<br>Department of person who has executed copying<br>Set of copies |
| Information on total number of pages | 20 |
| Page number information | 1-20 |
| Page number on which copy history is to be added | 1, 4 |
| Information on position at which copy history is to be added | Lower margin |
| Option for information to be added to copy | Copy prohibited<br>Redistribution prohibited<br>Subject to shredding |
| Possible number of times of adding copy history information | 5 |

Figure 17B:
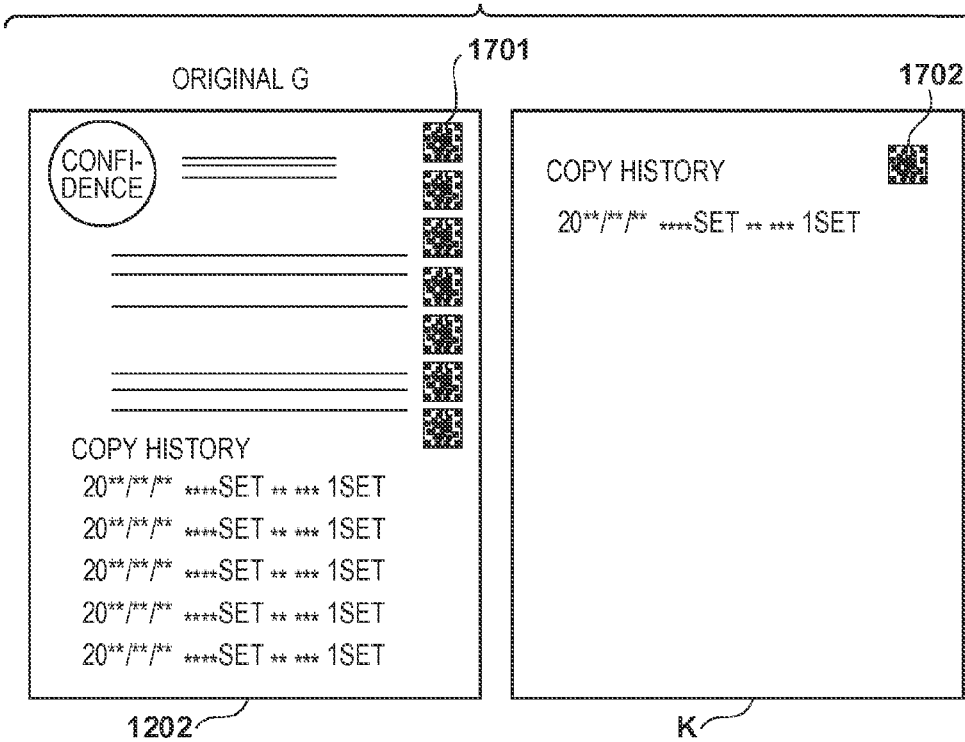
Figure 17C:
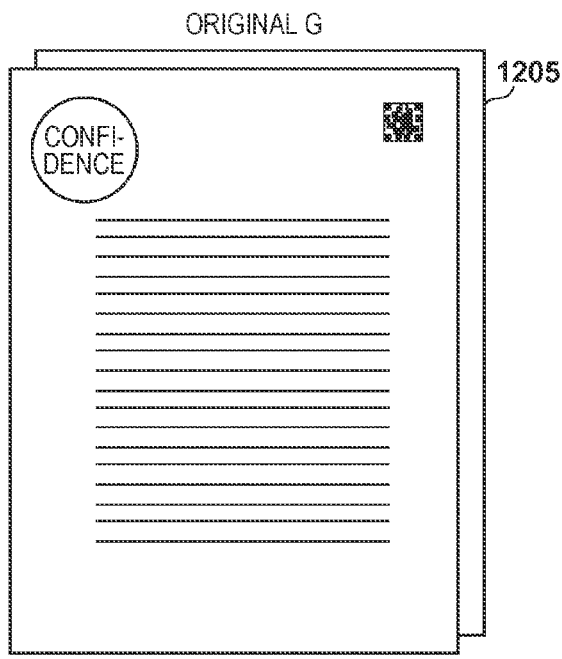
Figure 17D:
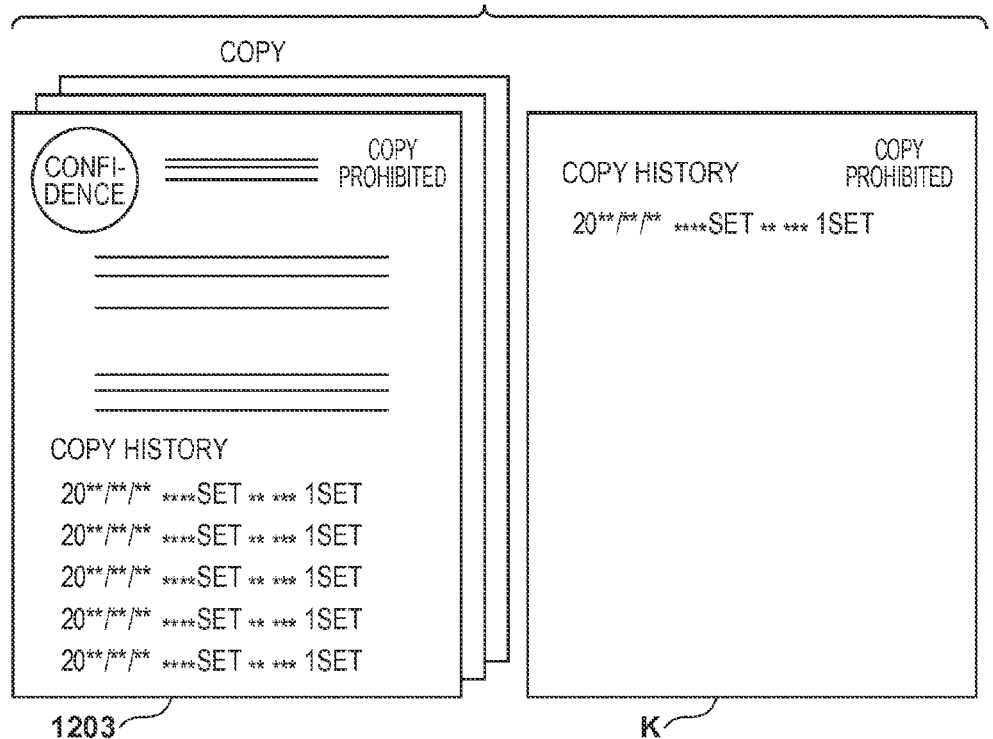

The two-dimensional bar-code 1701 of FIG. 17B is added at each time copying is performed in order to embed the number of times of adding the copy history information to the original G. That is, each time the two-dimensional bar-code 1701 is added, the information on the number of times of adding that is included therein is updated. Table 5 shows examples of items of information that are to be embedded into the two-dimensional bar-code 1701. Note that not only the number of times of adding but also the copy history information itself may be embedded into the two-dimensional bar-code 1701, and in this case, adding and printing the copy history information as characters may be omitted.

TABLE 5

| Items | Data examples |
| --- | --- |
| Number of times of adding copy history | 3 |
| Whether or not copy history description page k is added | Not |

A two-dimensional bar-code 1702 of FIG. 17B is printed at the time of creating the copy history description page K so that the number of times of adding the copy history information is embedded into the copy history description page K. The detail thereof will be described with reference to step S1904 of FIG. 19. Table 6 shows examples of items of information that are embedded into the two-dimensional bar-code 1702. Here, the possible number of times of adding the copy history information has a different upper limit because a new copy history description page has been added.

TABLE 6

| Items | Data examples |
| --- | --- |
| Whether it is copy history managed document or not? | YES |
| Copy history managed document ID number | ***** |
| Whether or not it is copy history description page k? | YES |
| Information on items to be added as copy history | Copy execution date<br>Name of person who has executed copying<br>Department of person who has executed copying<br>Set of copies |
| Option for information to be added to copy | Copy prohibited<br>Redistribution prohibited<br>Subject to shredding |
| Possible number of times of adding copy history information | 20 |

Figure 18A:
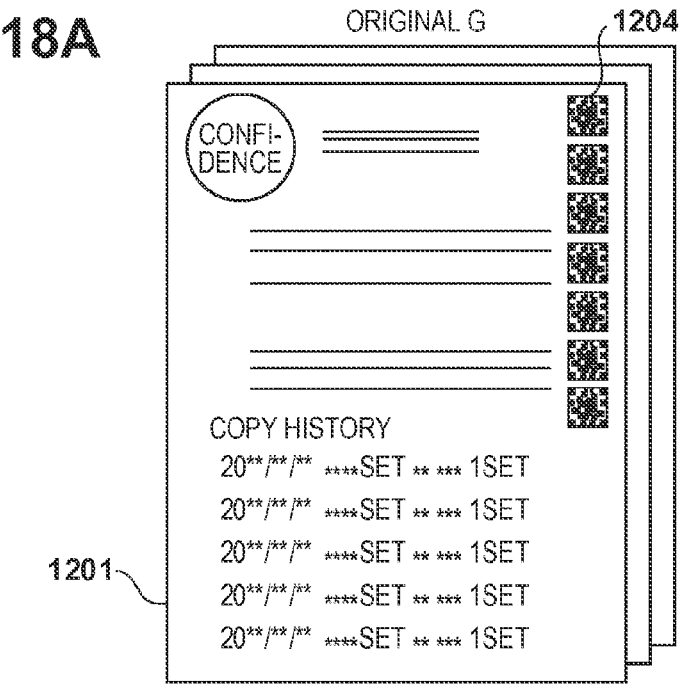
FIGS. 18A, 18B, 18C, and 18D are diagrams illustrating the adding of copy history information to an original according to the third embodiment.
Figure 18B:
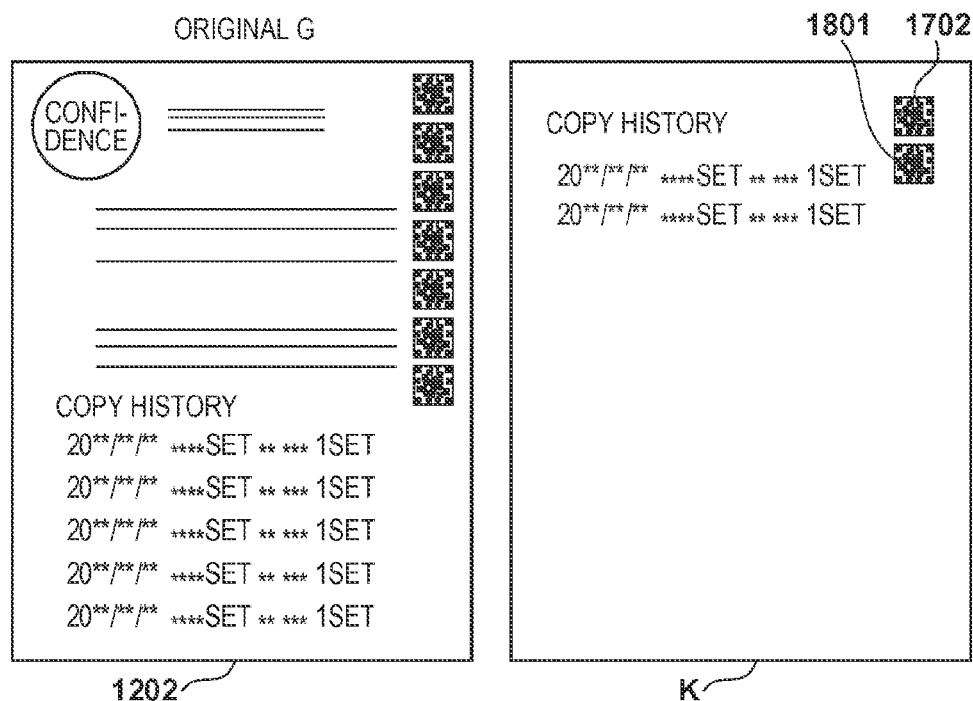
Figure 18C:
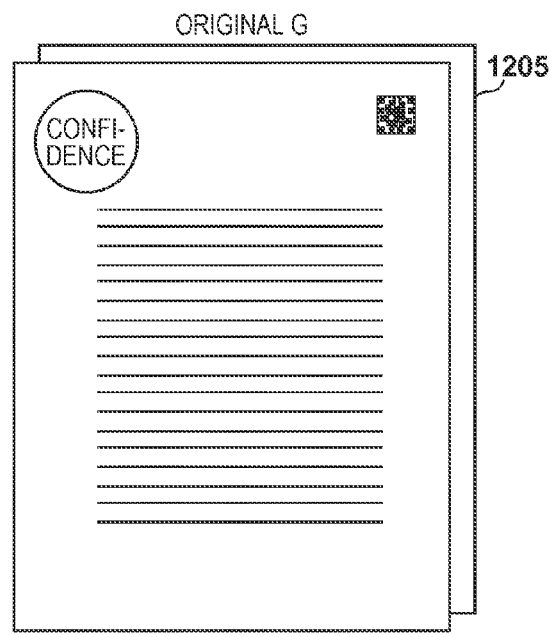
Figure 18D:
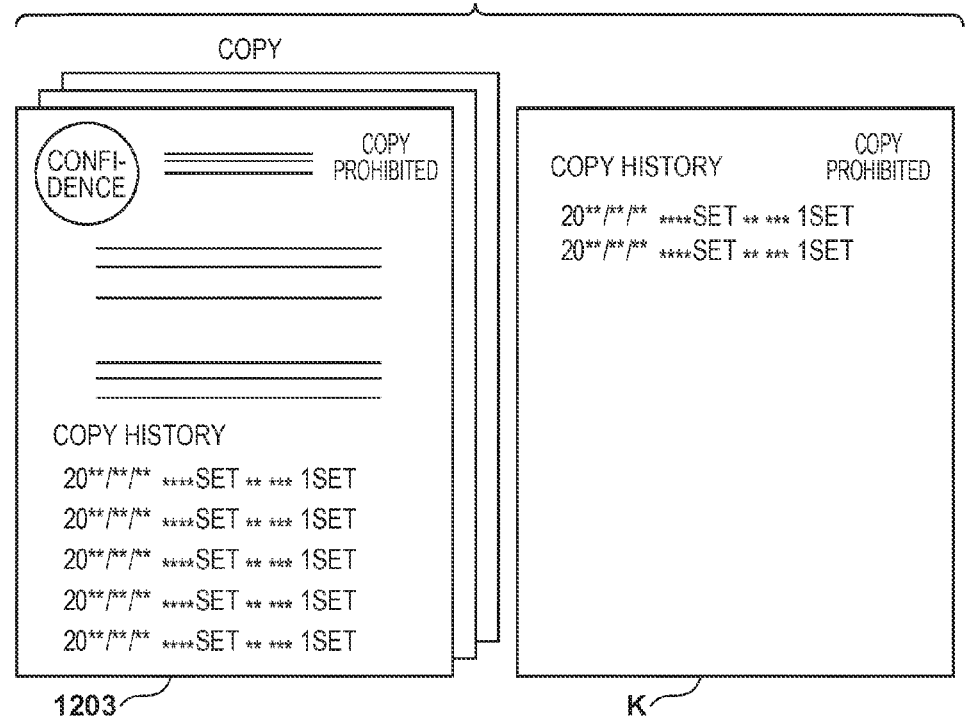

In contrast to FIGS. 17A to 17D, FIGS. 18A to 18D show the case where copy processing is performed in the state in which the copy history description page K has already been added. In FIG. 18A, the reference numeral 1201 denotes an original G before copying. Furthermore, the reference numeral 1202 of FIG. 18B denotes an original G after copying, and the reference numeral 1203 of FIG. 18D denotes a copy. The copy history description page K has already been added to the original G before copying. That is, as shown in FIGS. 17A to 17D, one copy history is printed on the copy history description page K. In this case, processing for adding and printing copy history information is not performed on the original G, but the processing for adding and printing copy history information is performed on the copy history description page K. Furthermore, a two-dimensional bar-code 1801 is printed on the copy history description page K as shown in FIG. 18B. The two-dimensional bar-code 1801 includes embedded information indicating an increase in the number of times of adding the copy history information by 1 (the number of times of adding has increased to "2"), as shown in Table 7.

TABLE 7

| Items | Data examples |
| --- | --- |
| Number of times of adding copy history | 2 |
| Whether or not copy history description page k is added | Not |

Processing Flow

Figure 19:
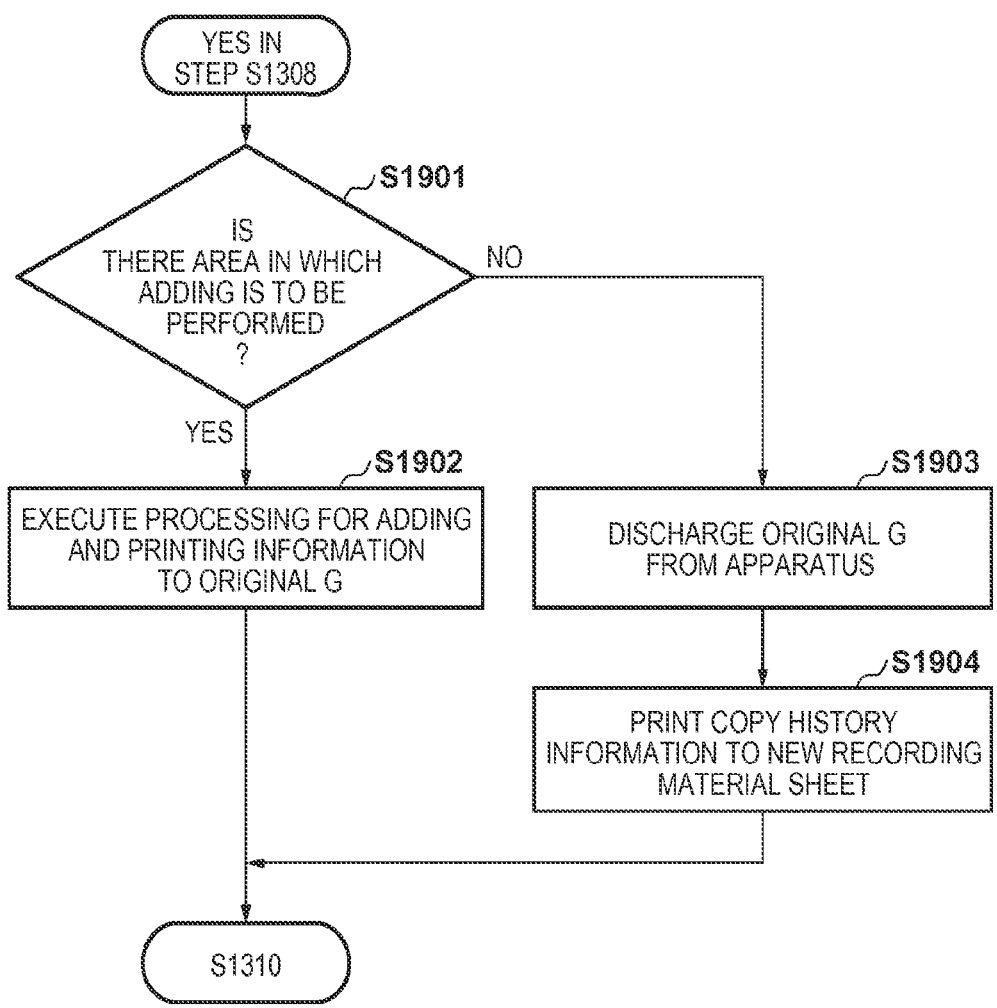
FIG. 19 is a flowchart for control of the adding of copy history information to an original according to the third embodiment.

The following will describe processing for adding copy history information to an original G of the image forming apparatus 1 according to the present embodiment with reference to the flowchart of FIG. 19, the processing including adding the copy history description page K. Note that in the flowchart of FIG. 19, the copy history description page that has already been added to the original G before copying is handled as the original G.

If it is determined in step S1308 that copy history information needs to be added and printed to the original G (Yes in step S1308), the image forming apparatus 1 determines in step S1901 whether or not there is an area to which the copy history information is to be added. Specifically, if the number of times of adding the copy history that is embedded into the two-dimensional bar-code 1701 is smaller than the possible number of times of adding the copy history information that is embedded into the two-dimensional bar-code 1204, the image forming apparatus 1 determines that adding and printing the copy history information to the original G are possible and there is an area for information addition. In this case (Yes in step S1901), the procedure advances to step S1902. On the other hand, if the possible number of times of adding the copy history information that is embedded into the two-dimensional bar-code 1204 is equal to the number of times of adding the copy history that is embedded into the two-dimensional bar-code 1701, the image forming apparatus 1 determines that it is not possible to add and print the copy history information to the copy history description page K and there is no area for information addition. In this case (No in step S1901), the procedure advances to step S1903.

In step S1902, the image forming apparatus 1 adds and prints the two-dimensional bar-code 1701 and the copy history information, based on the information embedded into the two-dimensional bar-code 1204. Note that as described above, in the case where the copy history information is embedded into the two-dimensional bar-code 1701, it is not necessary to print the copy history information as characters. Thereafter, the procedure advances to step S1310 of FIG. 13.

In step S1903, the image forming apparatus 1 performs processing for discharging the original G from the image forming apparatus 1 in order to perform adding and printing copy history information to a new recording material sheet S.

In step S1904, the image forming apparatus 1 performs processing for printing a two-dimensional bar-code and the copy history information to the new recording material sheet S. Specifically, the image forming apparatus 1 conveys the new recording material sheet S from the first sheet feed unit 3 by the CST pickup roller 23 and the conveyance rollers 27, and performs printing processing. Thereafter, the procedure advances to step S1310 of FIG. 13.

As described above, according to the present embodiment, in addition to the effects of the first embodiment, control is performed such that if copy history is added to an original G a predetermined number of times or more, the copy history information will be added to a new recording material sheet S. By this control, it is possible to prevent a failure in adding copy history information to an original due to the lack of a space for information addition.

Note that in the processing for calculating an blank space as described in the second embodiment (step S1601 of FIG. 16), if it is determined that there is no blank space, it is also possible to perform the adding processing with respect to a new recording material sheet, as with the present embodiment.

Other Embodiments

Furthermore, in the first to third embodiments, descriptions have been given taking, as an example, a configuration in which a component (image scanning unit 50) for scanning an image is provided in the image forming apparatus 1, as shown in FIG. 1. However, the present invention is not limited to this configuration, and may be applicable to a configuration in which the image scanning unit such as, for example, a scanner is provided on the outside of the apparatus. In this case, a configuration is also possible in which an image of an original or the like is scanned, for example, on the outside of the apparatus, and then the original is conveyed into the apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-220626, filed Oct. 29, 2014, which is hereby incorporated by reference herein in its entirety.

What is claimed is:

1. An image forming apparatus comprising:
an image forming unit configured to form an image;
an image scanning unit configured to scan an image; and
a control unit configured to perform control of the image forming unit and the image scanning unit so as to scan an image of an original by the image scanning unit and form the scanned image on a recording material,
wherein the control unit determines, after scanning of the original has been completed, whether formation of an additional image on the original by the image forming unit is completed, and
wherein the control unit, if the formation of the additional image on the original has not completed, controls the image forming unit not to form an image in which the original is scanned, and if the formation of the additional image on the original has completed, controls the image forming unit to form the image in which the original is scanned.

2. The image forming apparatus according to claim 1, wherein the additional image is an image that includes copy history-related information.

3. The image forming apparatus according to claim 2, wherein the control unit controls the image forming unit to form an image of the original scanned by the image scanning unit and an image created based on the copy history-related information.

4. The image forming apparatus according to claim 1, wherein a pattern image that indicates information at the time of forming the additional image is printed on the original.

5. The image forming apparatus according to claim 4, wherein the pattern image includes page number information on a page number of a page of the original on which the additional image is to be formed.

6. The image forming apparatus according to claim 5, wherein the control unit starts image formation with respect to a recording material sheet upon completion of the formation of the additional image on the page of the original that is set based on the page number information.

7. The image forming apparatus according to claim 4, wherein the pattern image printed on the original includes character size information on the size of characters for use in forming the additional image, and
the control unit specifies an area of the original in which the additional image can be formed, based on the character size information, and a marginal area of the image of the original scanned by the image scanning unit.

8. The image forming apparatus according to claim 4, wherein the pattern image printed on the original includes information that indicates an upper limit of the number of times that formation of the additional image can be executed,
the control unit updates the number of times that formation of the additional image has been executed each time the formation is executed, and performs control such that a new pattern image is added to the original, and
the control unit further determines whether or not formation of a new additional image can be executed, based on the information indicated by the pattern image printed on the original and the information indicated by the new pattern image.

9. The image forming apparatus according to claim 8, wherein if it is determined that the formation of a new additional image on the original is not possible, the control unit performs control such that copy history-related information is printed on a new recording material sheet, and the new recording material sheet on which the copy history-related information is printed is added to the original.

10. The image forming apparatus according to claim 4, wherein the pattern image is a two-dimensional bar-code.

11. The image forming apparatus according to claim 1, further comprising a setting unit configured to accept information that is to be added to a copy when the original is copied.

12. The image forming apparatus according to claim 1, further comprising a first conveyance path on which a recording material sheet is conveyed when image formation on the recording material sheet is performed by the image forming unit; and a second conveyance path on which an original is conveyed when scanning of an image of the original is performed by the image scanning unit, wherein the first conveyance path and the second conveyance path are each configured such that a conveyance material can be conveyed to the other conveyance path, and the control unit controls conveyance on the first and second conveyance paths depending on processing by the image scanning unit and the image forming unit.

13. The image forming apparatus according to claim 1, wherein the additional image is an image which includes information indicating an upper limit value of a number of times of forming the additional image on the original.

\* \* \* \* \*